(12) United States Patent
Wu et al.

(10) Patent No.: US 12,219,419 B2
(45) Date of Patent: Feb. 4, 2025

(54) CONDITIONAL HANDOVER MANAGEMENT

(71) Applicant: GOOGLE LLC, Mountain View, CA (US)

(72) Inventors: Chih-Hsiang Wu, Taoyuan (TW); Jing Hsieh, Taipei (TW)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/749,554

(22) Filed: May 20, 2022

(65) Prior Publication Data

US 2022/0279412 A1  Sep. 1, 2022

Related U.S. Application Data

(63) Continuation of application No. 17/765,536, filed as application No. PCT/US2020/053671 on Oct. 1, (Continued)

(51) Int. Cl.
*H04W 36/24* (2009.01)
*H04W 24/08* (2009.01)
(Continued)

(52) U.S. Cl.
CPC ........... *H04W 36/24* (2013.01); *H04W 24/08* (2013.01); *H04W 36/362* (2023.05);
(Continued)

(58) Field of Classification Search
CPC ..... H04W 36/24; H04W 76/30; H04W 76/27; H04W 24/08; H04W 36/08; H04W 74/0833; H04W 36/36; H04W 36/0058
See application file for complete search history.

(56) References Cited

U.S. PATENT DOCUMENTS 8,621,396 B1  12/2013  Gossweiler, III
9,495,532 B1  11/2016  Zhurkin
(Continued)

FOREIGN PATENT DOCUMENTS

EP  3 273 377 A1  1/2018
JP  2012-203902 A  10/2012
(Continued)

OTHER PUBLICATIONS

U.S. Appl. No. 62/842,330,Abstract,May 2, 2019 (Year: 2019).*
(Continued)

*Primary Examiner* — Ji-Hae Yea
(74) *Attorney, Agent, or Firm* — MARSHALL, GERSTEIN & BORUN LLP

(57) ABSTRACT

A source base station receives, from a candidate base station while a user device is operating in a source cell of the source base station, a first message that indicates a conditional handover configuration providing information for user device operation within a candidate target cell of the candidate base station, but does not indicate a corresponding condition for handing over to the candidate target cell. The source base station generates the corresponding condition for handing over to the candidate target cell, and sends, to the user device, a second message that indicates the conditional handover configuration and the corresponding condition.

5 Claims, 20 Drawing Sheets

Related U.S. Application Data 2020, which is a continuation of application No. 16/879,977, filed on May 21, 2020, now abandoned.

(60) Provisional application No. 62/910,448, filed on Oct. 3, 2019.

(51) Int. Cl.
| | |
|---|---|
| *H04W 36/08* | (2009.01) |
| *H04W 36/36* | (2009.01) |
| *H04W 74/0833* | (2024.01) |
| *H04W 76/27* | (2018.01) |
| *H04W 76/30* | (2018.01) |

(52) U.S. Cl.
CPC ....... *H04W 74/0833* (2013.01); *H04W 76/27* (2018.02); *H04W 76/30* (2018.02); *H04W 36/08* (2013.01)

(56) References Cited

U.S. PATENT DOCUMENTS

| | | |
|---|---|---|
| 2011/0268087 A1 | 11/2011 | Kwon et al. |
| 2012/0246008 A1 | 9/2012 | Hamilton, II et al. |
| 2012/0323700 A1 | 12/2012 | Aleksandrovich et al. |
| 2018/0041930 A1 | 2/2018 | Hampel et al. |
| 2019/0223073 A1 | 7/2019 | Chen et al. |
| 2019/0236250 A1 | 8/2019 | Paxton et al. |
| 2019/0281511 A1 | 9/2019 | Susitaival et al. |
| 2020/0077314 A1 | 3/2020 | Hwang et al. |
| 2020/0351694 A1 | 11/2020 | Chen et al. |
| 2020/0351734 A1* | 11/2020 | Purkayastha ..... H04W 36/0094 |
| 2021/0321298 A1 | 10/2021 | Keskitalo et al. |
| 2022/0272589 A1 | 8/2022 | Ishii |
| 2022/0386197 A1* | 12/2022 | Hwang ........... H04W 36/00835 |

FOREIGN PATENT DOCUMENTS

| | | |
|---|---|---|
| JP | 2018-538622 A | 12/2018 |
| WO | WO-2018/113661 A1 | 6/2018 |
| WO | WO-2018/203716 A1 | 11/2018 |
| WO | WO-2019/158801 A1 | 8/2019 |

OTHER PUBLICATIONS

U.S. Appl. No. 62/842,330,Drawings-only_black_and_white_line_drawings,May 2, 2019 (Year: 2019).*
U.S. Appl. No. 62/842,330,Specification,May 2, 2019 (Year: 2019).*
CATT ("Handling of Conditional Handover Failure in NR", 3GPP TSG-RAN WG2 Meeting #106, R2-1906649, May 13-17, 2019) (Year: 2019).*
Intel Corporation ("Failure handling on CHO", 3GPP TSG RAN WG2 Meeting #106, R2-1906292, May 13-17, 2019) (Year: 2019).*
International Search Report and Written Opinion for Application No. PCT/US2020/053671, dated Dec. 21, 2020.
Ericsson, "Conditional Handover in NR," 3GPP Draft (2019).
MediaTek Inc., "Discussions on NR Conditional Handover Procedures," 3GPP Draft (2019).
3GPP TS 36.300 V15.6.0, 3rd Generation Partnership Project;Technical Specification Group Radio Access Network;Evolved Universal Terrestrial Radio Access (E-UTRA) and Evolved Universal Terrestrial Radio Access Network (E-UTRAN);Overall description; Stage 2(Release 15), (2019).
3GPP TS 36.323 V15.4.0, "3rd Generation Partnership Project; Technical Specification Group Radio Access Network; Evolved Universal Terrestrial Radio Access (E-UTRA); Packet Data Convergence Protocol (PDCP) specification (Release 15)," (2019).
3GPP TS 36.331 V15.7.0, "3rd Generation Partnership Project; Technical Specification Group Radio Access Network; Evolved Universal Terrestrial Radio Access (E-UTRA); Radio Resource Control (RRC); Protocol specification (Release 15)," (2019).
3GPP TS 38.300 v15.6.0, "3rd Generation Partnership Project; Technical Specification Group Radio Access Network; NR; NR and NG-RAN Overall Description; Stage 2 (Release 15)" (2019).
3GPP TS 38.323 V15.6.0, "3rd Generation Partnership Project; Technical Specification Group Radio Access Network; NR; Packet Data Convergence Protocol (PDCP) specification (Release 15)," (2019).
3GPP TS 38.331 V15.7.0, "3rd Generation Partnership Project; Technical Specification Group Radio Access Network; NR; Radio Resource Control (RRC) protocol specification (Release 15)," (2019).
3GPP TS 38.473 V15.7.0, "3rd Generation Partnership Project; Technical Specification Group Radio Access Network; NG-RAN; F1 application protocol (F1AP) (Release 15)," (2019).
U.S. Appl. No. 62/842,202,Specification,May 2, 2019 (Year: 2019).
U.S. Appl. No. 62/842,211,Specification,May 2, 2019 (Year: 2019).
Ericsson, "Conditional Handover in NR," 3GPP TSG RAN WG2 #105 (2019).
Ericsson, "Handling of a HO Command while UE is Monitoring CHO," 3GPP Draft (2019).
Huawei, "Discussion on Control Plan Signalling Design for LTE CHO," 3GPP Draft (2019).
Intel Corporation, "New WID: NR mobility enhancements," 3GPP TSG RAN Meeting #83 (2019).
International Search Report and Written Opinion for Application No. PCT/US2020/053668, dated Dec. 23, 2020.
Notice of Reasons for Rejection for Japanese Application No. 2020-520119, dated Feb. 28, 2022.
Qualcomm Incorporated "Conditional HO configuration handling", 3GPP TSG-RAN WG2 Meeting #107, R2-1908934, Aug. 26-30, 2019) (Year: 2019).
Qualcomm Incorporated, "LTE Conditional HO Design Considerations," 3GPP Draft (2019).
Tsuchiya et al., "Secure Communications Protocol Between Humans and a Bank Server to Prevent Man in the Browser Attack," Institute of Electronics, Information and Communication Engineers Technical Report, 115(4):149-157 (2016).
CATT, "Discussion onon Intra-CU CHO," 3GPP Draft (Aug. 17, 2019).
Office Action for European Application No. 20793877.0, dated Apr. 11, 2023.
Samsung et al., "C-RNTI Allocation in Mobility Procedure," 3GPP Draft (Aug. 21, 2017).
Samsung, "Introducing CHO Indication to gNB-DU and gNB-CU-UP," 3GPP Draft (Aug. 16, 2019).
ZTE Corporation et al., "Discussion on the Configuration of CHO Execution Conditions," 3GPP Draft (May 13, 2019).
Ericsson, "Triggering of Conditional Handover in NR," 3GPP TSG RAN WG2 #105 (2019).

* cited by examiner

CONDITIONAL HANDOVER MANAGEMENT

CROSS-REFERENCE TO RELATED APPLICATIONS

This is a continuation of U.S. patent application Ser. No. 17/765,536, entitled "Conditional Handover Management" and filed on Mar. 31, 2022, which is a national stage application of PCT Patent Application No. PCT/US20/53671, entitled "Conditional Handover Management" and filed on Oct. 1, 2020, which is a continuation of Ser. No. 16/879,977, entitled "Conditional Handover Management" and filed on May 21, 2020, and which claims the benefit of U.S. Provisional Patent Application No. 62/910,448, entitled "Conditional Handover Management" and filed on Oct. 3, 2019. The entire disclosure of each of the above-identified applications is hereby incorporated herein by reference.

FIELD OF THE DISCLOSURE

This disclosure relates generally to wireless communications and, more particularly, to conditional handover procedures.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP TS 36.323) and New Radio (NR) (see TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs when communicating with a base station. So-called SRB1 resources carry RRC messages, which in some cases include NAS messages, over the dedicated control channel (DCCH). SRB2 resources support RRC messages that include logged measurement information or NAS messages, also over the DCCH but with lower priority than SRB1 resources. More generally, SRB1 and SRB2 resources allow the UE and the base station to exchange RRC messages.

UEs can perform handover procedures to switch from one cell to another. The UE may handover from a cell of a first base station to a cell of a second base station, or from a cell of a first distributed unit (DU) of a base station to a cell of a second DU of the same base station, depending on the scenario. 3GPP specifications 36.300 v15.6.0 and 38.300 v15.6.0 describe a handover procedure that includes several steps (RRC signaling and preparation) between radio access network (RAN) nodes, which cause latency in the handover procedure and therefore increase the risk of handover failure. This procedure, which does not involve conditions that are checked at the UE, can be referred to as an "immediate" handover procedure. The immediate handover procedure generally includes several steps (RRC signaling and preparation) between RAN nodes and the UE, which cause latency in the handover procedure and therefore increase the risk of handover failure.

More recently, "conditional" handover procedures have been considered. Unlike the immediate handover procedure discussed above, the conditional handover procedure does not perform the handover until the UE determines that a condition is satisfied. To configure a conditional handover procedure, the RAN provides the condition to the UE, along with a conditional handover configuration (e.g., a set of random-access preambles, etc.) that will enable the UE to communicate with the appropriate base station, or via the appropriate cell, when the condition is satisfied. For a conditional handover from a source base station to a candidate base station, for example, the RAN provides the UE with a condition to be satisfied before the UE can handover to the candidate base station, and a conditional handover configuration that enables the UE to communicate with that candidate base station after the condition has been satisfied.

However, opportunities exist for improving the manner in which the RAN nodes manage the configurations and conditions that are associated with conditional handovers. Under recently proposed systems, for example, a source base station in the RAN might send the UE a condition that does not account for the state of other portions of the RAN (e.g., a condition that, if met, causes the UE to hand over to a candidate base station that is heavily congested relative to the source base station). This, and other issues relating to conditional handover management, can result in significant network inefficiencies (e.g., lower network capacity or average data rates, more radio link failures, etc.).

SUMMARY

Base stations and UEs of this disclosure implement techniques that enable a UE to conditionally handover from a source base station or cell to a candidate base station or cell in a manner that avoids or reduces network inefficiencies. In some of these techniques, for example, the source base station provides the handover condition(s) to the candidate base station, and the candidate base station optionally modifies (e.g., fully or partially replaces) the condition(s) based on network congestion at the candidate base station and/or other suitable factors. The candidate base station may then send the source base station one or more conditional handover configurations that enables the UE to communicate with the candidate base station (should the handover occur), along with the unmodified, modified and/or replaced condition(s). In some implementations and/or scenarios, the source base station and/or the candidate base station can modify or replace one or more conditional handover configurations and/or conditions that the source base station previously sent to the UE. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.). It is understood, therefore, that the terms "condition," "conditions" and "condition(s)" may be used interchangeably in the context of a conditional handover procedure for a single candidate base station.

Moreover, the term "condition" may be used herein to refer to the condition in the abstract (e.g., signal quality being in a particular state), or to refer to a condition configuration (e.g., a digital representation/expression of the condition that can be transmitted and stored, etc.). By contrast, as used herein, the term "conditional handover configuration" refers to one or more configurations associated with a condition that is to be satisfied before the UE can communicate with a candidate base station, or via a candidate target cell, using that configuration. The configurations can include a radio bearer configuration (e.g., RadioBearerConfig IE, DRB-ToAddMod IE or DRB-ToRelease IE), a physical layer configuration, a MAC configuration, an RLC configuration, a PDCP configuration, an SDAP configuration, or any suitable configuration included in a CellGroupConfig IE or in a RadioResourceConfigDedicated IE.

One example implementation of these techniques is a method in a source base station, that includes receiving, from a candidate base station while a user device is operating in a source cell of the source base station, a first message that indicates a conditional handover configuration providing information for user device operation within a candidate target cell of the candidate base station, but does not indicate a corresponding condition for handing over to the candidate target cell. The method also includes generating, by processing hardware of the source base station, the corresponding condition for handing over to the candidate target cell, and sending, to the user device, a second message that indicates the conditional handover configuration and the corresponding condition.

Another example implementation of these techniques is a method in a candidate base station, including receiving, from a source base station while a user device is operating in a source cell of the source base station, a first message requesting a conditional handover of the user device to a candidate target cell of the candidate base station. The method also includes, in response to the first message, sending to the source base station a second message that indicates a conditional handover configuration providing information for user device operation within the candidate target cell, but does not indicate a corresponding condition for handing over to the candidate target cell.

DETAILED DESCRIPTION OF THE DRAWINGS

Figure 1A:
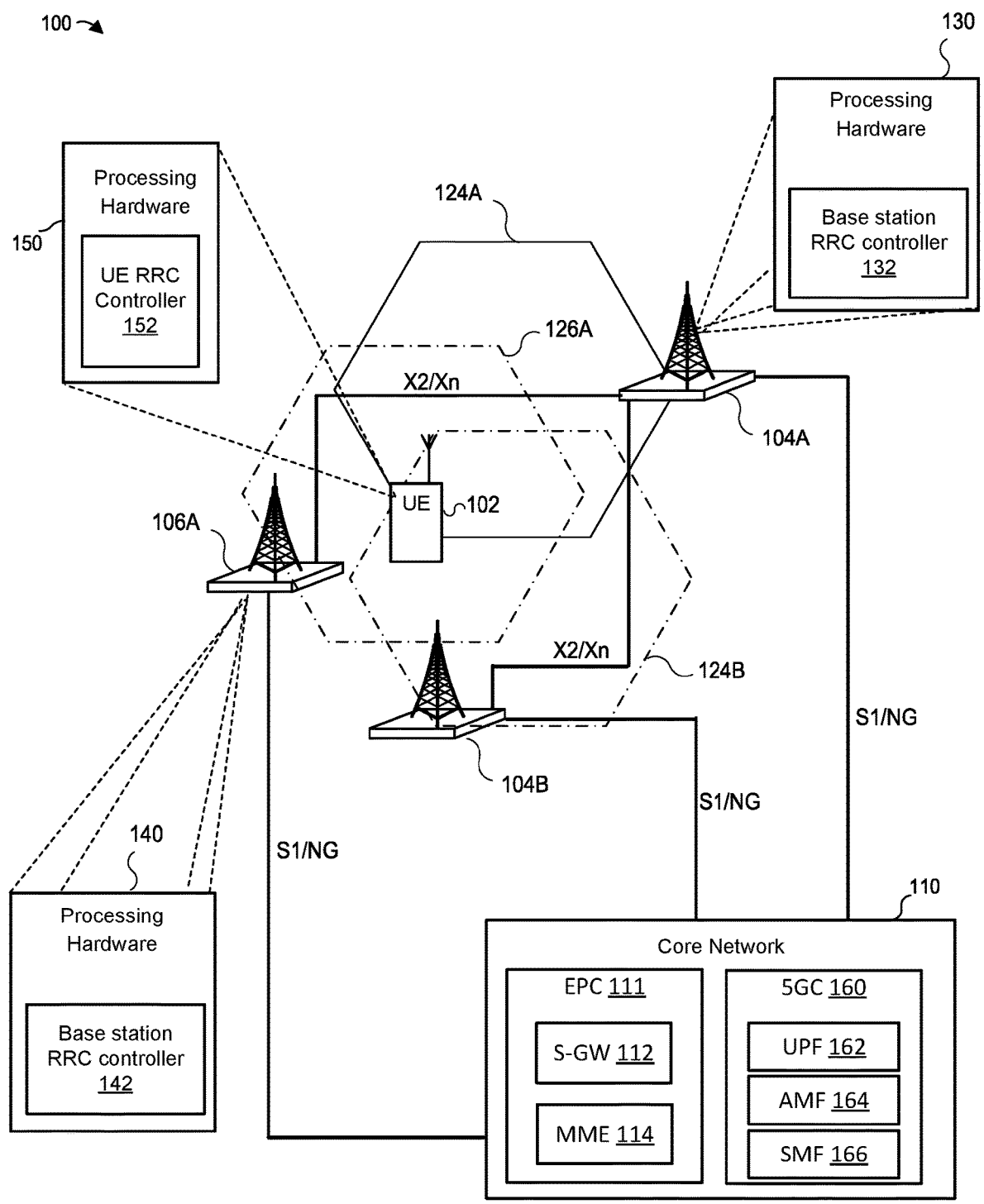
FIGS. 1A and 1B are block diagrams of example systems in which a radio access network (RAN) and a user device (UE) can implement techniques of this disclosure for managing conditional handover procedures.

FIG. 1A depicts an example wireless communication system 100 that can implement techniques of this disclosure for managing conditional handover configurations and/or conditions. The wireless communication system 100 includes a UE 102, as well as base stations 104A, 106A that are connected to a core network (CN) 110. The wireless communication system 100 can enhance connection robustness or reliability among the UE 102 and the base stations 104A, 106A to enable handover of the UE 102 between coverage of the base stations 104A, 106A. The base stations 104A, 106A can be any suitable type, or types, of base stations, such as an evolved node B (eNB), a next-generation eNB (ng-eNB), or a 5G Node B (gNB), for example.

The base station 104A supports a cell 124A, and the base station 106A supports a cell 126A. The cell 124A partially overlaps with cell 126A, such that the UE 102 can be in range to communicate with base station 104A while simultaneously being in range to communicate with base station 106A (or in range to detect or measure the signal from both base stations 104A and 106A, etc.). The overlap may make it possible for the UE 102 to handover between cells (e.g., from cell 124A to cell 126A) before the UE 102 experiences radio link failure, for example. In implementations and scenarios where the UE 102 is connected with the base station 104A, the base station 104A operates as a source base station (S-BS), and the base station 106A operates as a candidate base station (C-BS). Although various scenarios are described below in which the base station 104A operates as an S-BS and the base station 106A operates as a C-BS, any of the base stations 104A, 106A generally can operate as an S-BS or C-BS in different scenarios. Thus, in some implementations, the base stations 104A, 106A can implement similar sets of functions and each support S-BS and C-BS operations.

In operation, the UE 102 can use a radio bearer (e.g., a DRB or an SRB) that at different times can terminate at difference base stations (e.g., the base station 104A or the base station 106A). The UE 102 can apply one or more security keys when communicating on the radio bearer, in the uplink (from the UE 102 to a base station) and/or downlink (from a base station to the UE 102) direction.

The base station 104A includes processing hardware 130, which may include one or more general-purpose processors (e.g., central processing units (CPUs)) and a computer-readable memory storing machine-readable instructions executable on the general-purpose processor(s), and/or special-purpose processing units. The processing hardware 130 in the example implementation of FIG. 1A includes a base station RRC controller 132 that is configured to manage or control RRC procedures and RRC configurations. For example, the base station RRC controller 132 may be configured to support RRC messaging associated with immediate and conditional handover procedures, and/or to support the necessary operations when the base station 104A operates as an S-BS, as discussed below. The base station RRC controller 132 may also be configured to, in some scenarios, operate instead as a C-BS. Moreover, in some implementations and/or scenarios, the base station RRC controller 132 may be responsible for reconfiguring (for the UE 102 and a number of other UEs not shown in FIG. 1A) current sets of conditional handover configurations and conditions (i.e., condition configurations) in accordance with various techniques discussed below.

The base station 106A includes processing hardware 140, which may include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes a base station RRC controller 142 that is configured to manage or control RRC procedures and RRC configurations. For example, the base station RRC controller 142 may be configured to support RRC messaging associated with immediate and conditional handover procedures, and/or to support the necessary operations when the base station 106A operates as a C-BS, as discussed below. The base station RRC controller 142 may also be configured to, in some scenarios, operate instead as an S-BS. Moreover, in some implementations and/or scenarios, the base station RRC controller 142 may be responsible for reconfiguring (for the UE 102 and a number of other UEs not shown in FIG. 1A) current sets of conditional handover configurations and conditions in accordance with various techniques discussed below. In some implementations, the RRC controller 142 is similar to the RRC controller 132 or, more generally, the processing hardware 140 may be similar to the processing hardware 130.

The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes a UE RRC controller 152 that is configured to manage or control RRC procedures and RRC configurations. For example, the UE RRC controller 152 may be configured to support RRC messaging associated with immediate and conditional handover procedures, and may also be responsible for reconfiguring a current set of conditional handover configurations and conditions for the UE 102 (e.g., releasing or modifying conditional handover configurations or conditions as needed) in accordance with any of the techniques discussed below.

The CN 110 may be an evolved packet core (EPC) 111 or a fifth-generation core (5GC) 160, both of which are depicted in FIG. 1A. Each of the base stations 104A, 106A may be an eNB supporting an S1 interface for communicating with the EPC 111, an ng-eNB supporting an NG interface for communicating with the 5GC 160, or as a base station that supports the NR radio interface as well as an NG interface for communicating with the 5GC 160. To directly exchange messages with each other during the various scenarios discussed below, the base stations 104A, 106A may support an X2 or Xn interface.

Among other components, the EPC 111 can include a Serving Gateway (S-GW) 112 and a Mobility Management Entity (MME) 114. The S-GW 112 is generally configured to transfer user-plane packets related to audio calls, video calls, Internet traffic, etc., and the MME 114 is generally configured to manage authentication, registration, paging, and other related functions. The 5GC 160 includes a User Plane Function (UPF) 162 and an Access and Mobility Management Function (AMF) 164, and/or a Session Management Function (SMF) 166. The UPF 162 is generally configured to transfer user-plane packets related to audio calls, video calls, Internet traffic, etc., the AMF 164 is generally configured to manage authentication, registration, paging, and other related functions, and the SMF 166 is generally configured to manage PDU sessions.

Generally, the wireless communication system 100 may include any suitable number of base stations supporting NR cells and/or EUTRA cells. More particularly, the EPC 111 or the 5GC 160 can be connected to any suitable number of base stations supporting NR cells and/or EUTRA cells. For example, additional base stations are considered in immediate and conditional handover as discussed below with reference to FIGS. 1A and 1B. Although the examples below refer specifically to specific CN types (EPC, 5GC) and RAT types (5G NR and EUTRA), in general the techniques of this disclosure also can apply to other suitable radio access and/or core network technologies, such as a sixth generation (6G) radio access and/or 6G core network, for example.

Example operation of various handover-related procedures that may be implemented by the wireless communication system 100 will now be described.

In some implementations, the wireless communication system 100 supports immediate handovers between cells. In one scenario, for example, the UE 102 initially connects to the base station 104A, and the base station 104A later performs preparation for an immediate handover with the base station 106A via an interface (e.g., X2 or Xn). In this scenario, the base stations 104A and 106A operate as a source base station and a target base station, respectively. In the handover preparation, the source base station 104A may send a Handover Request message to the target base station 106A. In response, the target base station 106A may include an immediate handover command message in a Handover Request Acknowledge message, and send the Handover Request Acknowledge message to the source base station 104A. The source base station 104A may then transmit the immediate handover command message to the UE 102 in response to receiving the Handover Request Acknowledge message.

Upon receiving the immediate handover command message, the UE 102 immediately reacts to the message by attempting to connect to the target base station 106A. To connect to the target base station 106A, the UE 102 may perform a random access procedure with the target base station 106A, and then (after gaining access to a control channel) transmit a Handover Complete message to the target base station 106A via a cell of the target base station 106A (i.e., in response to the immediate handover command message).

In some implementations, the wireless communication system 100 also supports conditional handovers. In one implementation and scenario, for example, the UE 102 initially connects to the base station 104A, and the base station 104A later performs a first conditional handover preparation procedure with the base station 106A via an interface (e.g., X2 or Xn) to prepare for a potential handover of the UE 102 to the base station 106A. In this scenario, the base stations 104A and 106A operate as a source base station (S-BS) and a candidate base station (C-BS), respectively. In the first conditional handover preparation procedure, the S-BS 104A sends a Handover Request message to the C-BS 106A. In response, the C-BS 106A includes a first conditional handover command message in a Handover Request Acknowledge message, and sends the Handover Request Acknowledge message to the S-BS 104A. The S-BS 104A then transmits the first conditional handover command message to the UE 102, in response to receiving the Handover Request Acknowledge message.

Upon receiving the first conditional handover command message, the UE 102 does not immediately react to the first conditional handover command message by attempting to connect to the C-BS 106A. Instead, the UE 102 connects to the C-BS 106A according to the first conditional handover command message only if the UE 102 determines that a first condition (or a first set of conditions) is satisfied for handing over to a candidate target cell 126A of the C-BS 106A. The C-BS 106A provides a conditional handover configuration for the candidate target cell 126A (i.e., a configuration that the UE 102 can use to connect with the base station 106A via the candidate target cell 126A) in the first conditional handover command message. Although the UE 102 is described as using a single configuration to connect with the base station 106A when the UE 102 determines that a single condition is satisfied for convenience, the UE 102 may determine multiple conditions and use multiple configurations to connect with the base station 106A.

Before the first condition is met, the UE 102 has not yet connected to the C-BS 106A. In other words, the C-BS 106A has not yet connected and served the UE 102. In some implementations, the first condition can be that a signal strength/quality, as measured by the UE 102 on the candidate target cell 126A of the C-BS 106A, is "good" enough. For example, the first condition may be satisfied if one or more measurement results obtained by the UE 102 (when performing measurements on the candidate target cell 126A) are above a threshold that is configured by the S-BS 104A, or above a pre-determined or pre-configured threshold. In another example, the first condition may be satisfied if one or more measurement results obtained by the UE 102 on the candidate target cell 126A are above a threshold that is configured by the S-BS 104A, or above an otherwise pre-determined or pre-configured threshold, and if one or more measurement results obtained by the UE 102 on the source cell 124A (or alternatively, neighbor cell 126B) are below a threshold that is configured by the S-BS 104A, or above an otherwise pre-determined or pre-configured threshold. If the UE 102 determines that the first condition is satisfied, the C-BS 106A becomes the "target" base station 106A for the UE 102, and the UE 102 attempts to connect to the target base station 106A. To connect to the target base station 106A, the UE 102 may perform a random access procedure with the target base station 106A, and then (after gaining access to a control channel) transmit a first Handover Complete message via the candidate target cell 126A to the target base station 106A. After the UE 102 successfully completes the random access procedure and/or transmits the first Handover Complete message, the target base station 106A becomes the S-BS 106A for the UE 102, and the UE 102 starts communicating data with the S-BS 106A.

In some implementations and/or scenarios, conditional handovers can occur with more than one candidate target cell supported by the C-BS 106A (e.g., cell 126A and another cell of base station 106A not shown in FIG. 1A). In one such scenario, the C-BS 106A may provide a conditional handover configuration of an additional candidate target cell of the C-BS 106A, in addition to a conditional handover configuration of the candidate target cell 126A, in the first conditional handover command message. The UE 102 may then monitor whether a second condition is met for the additional candidate target cell of the C-BS 106A, while also monitoring whether the first condition is met for the candidate target cell 126A. The second condition can be the same as or different from the first condition.

In another scenario, the S-BS 104A also performs a second conditional handover preparation procedure with the C-BS 106A via the interface (e.g., X2 or Xn), to prepare a potential handover of the UE 102 to the C-BS 106A, in a procedure similar to that described above. In this scenario, however, the S-BS 104A also transmits to the UE 102 a second conditional handover command message that the S-BS 104A received from the C-BS 106A, for the potential handover in the second conditional handover preparation. The C-BS 106A may provide a conditional handover configuration of an additional candidate target cell (not shown in FIG. 1A) in the second conditional handover command message. The UE 102 may monitor whether a second condition is met for the additional candidate target cell of the C-BS 106A. The second condition can be the same as or different from the first condition.

The S-BS 104A may also perform a third conditional handover preparation procedure with a base station 104B via an interface (e.g., X2 or Xn), to prepare a potential handover of the UE 102 to the base station 104B, in a procedure similar to that described above. The base station 104B supports a cell 124B that partially overlaps the cell 124A and possibly also the cell 126A. The base station 104B may be similar to the base station 104A, and possibly also similar to the base station 106A, for example. In this scenario, the S-BS 104A transmits to the UE 102 a third conditional handover command message, which the S-BS 104A received from the C-BS 104B for the potential handover in the third conditional handover preparation. The C-BS 104B may provide a conditional handover configuration of a candidate target cell 124B in the third conditional handover command message. The UE 102 may monitor whether a third condition is met for the candidate target cell 124B of the C-BS 104B. The third condition can be the same as or different from the first condition and/or the second condition. The conditional handover command messages above can be RRC reconfiguration messages, or may be replaced by conditional handover configurations that are information elements (IEs)).

Figure 1B:
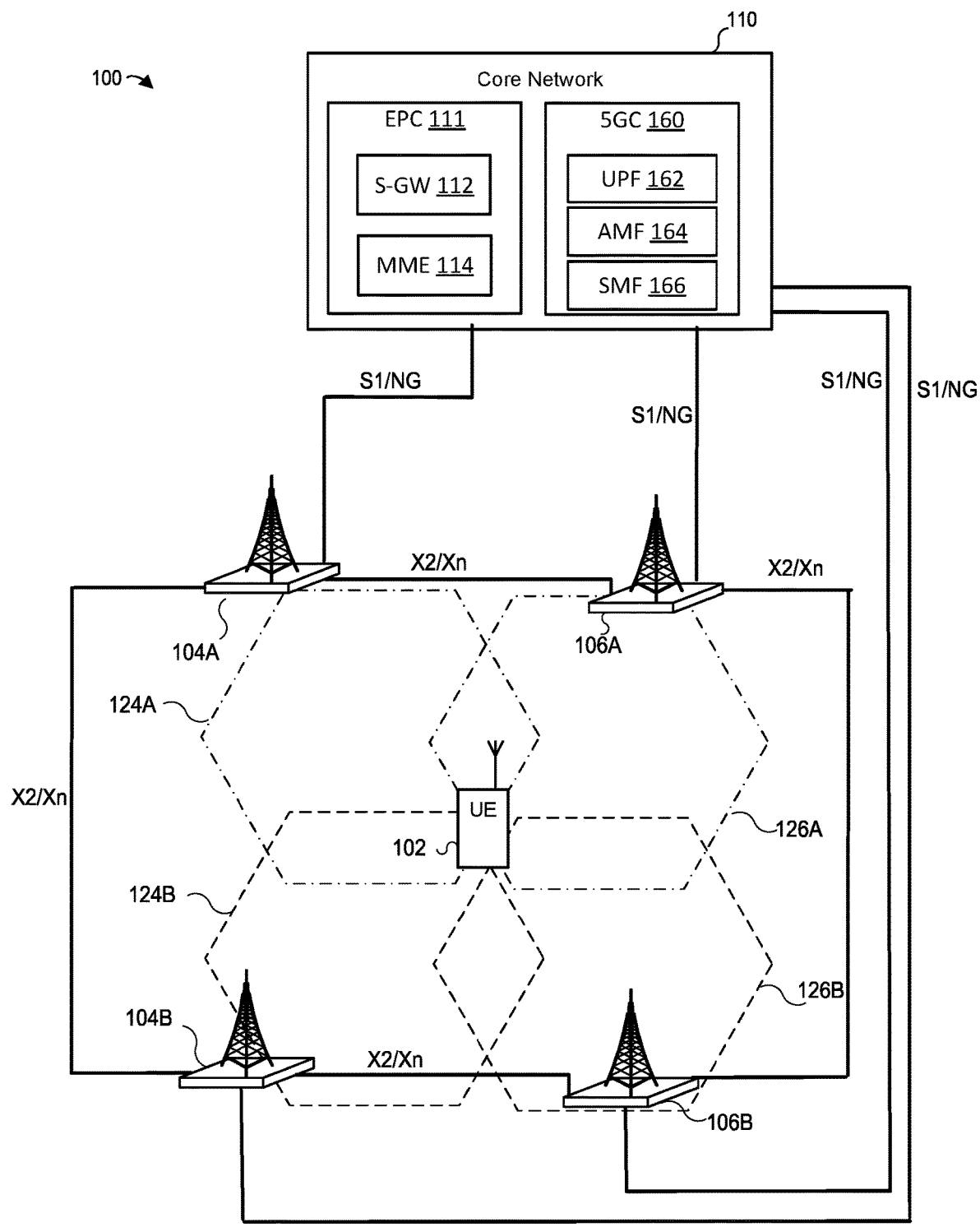

FIG. 1B illustrates another implementation of the wireless communication system 100, where the CN 110 is connected to a base station 106B in addition to the base stations 104A, 106A, and 104B. The base station 106B may be similar to the base station 106A, and possibly also similar to the base stations 104A and/or 104B. The base station 106B supports a cell 126B. The cells 126B and 126A may partially overlap, such that the UE 102 can detect or measure the signal from both the base station 106B and the base station 106A while in a fixed location. In some implementations, the base station 104A, 104B, 106A, and/or 106B support one or more additional cells not shown in FIG. 1B. The base stations 104A, 104B, 106A, and 106B may support both immediate handover and conditional handover procedures, such as those discussed above and as discussed in further detail below.

Figure 1C:
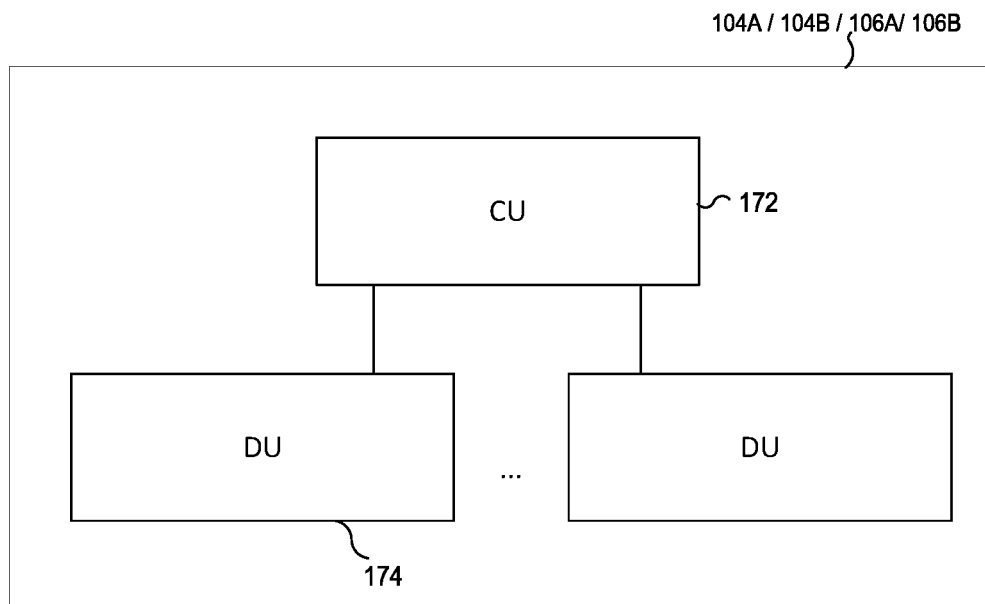
FIG. 1C is a block diagram of an example distributed base station that can operate in the system of FIG. 1A or FIG. 1B.

FIG. 1C depicts an example, distributed implementation of any one or more of the base stations 104A, 104B, 106A, 106B. In this implementation, the base station 104A, 104B, 106A, or 106B includes a centralized unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 may include some or all of the processing hardware 130 or 140 of FIG. 1A. The processing hardware of the CU 172 may include a base station RRC controller (e.g., controller 142) configured to manage or control one or more RRC configurations and/or RRC procedures when the base station (e.g., base station 106A) operates as an S-BS, a C-BS, or a target base station, for example.

Each of the DU 174s also includes processing hardware that can include one or more general-purpose processors (e.g., CPUs) and computer-readable memory storing machine-readable instructions executable on the one or more general-purpose processors, and/or special-purpose processing units. For example, the processing hardware of the DU 174 may include a medium access control (MAC) controller configured to manage or control one or more MAC operations or procedures (e.g., a random access procedure), and a radio link control (RLC) controller configured to manage or control one or more RLC operations or procedures. The processing hardware of the DU 174 may also include a physical layer (PHY) controller configured to manage or control one or more physical layer operations or procedures.

Figure 2:
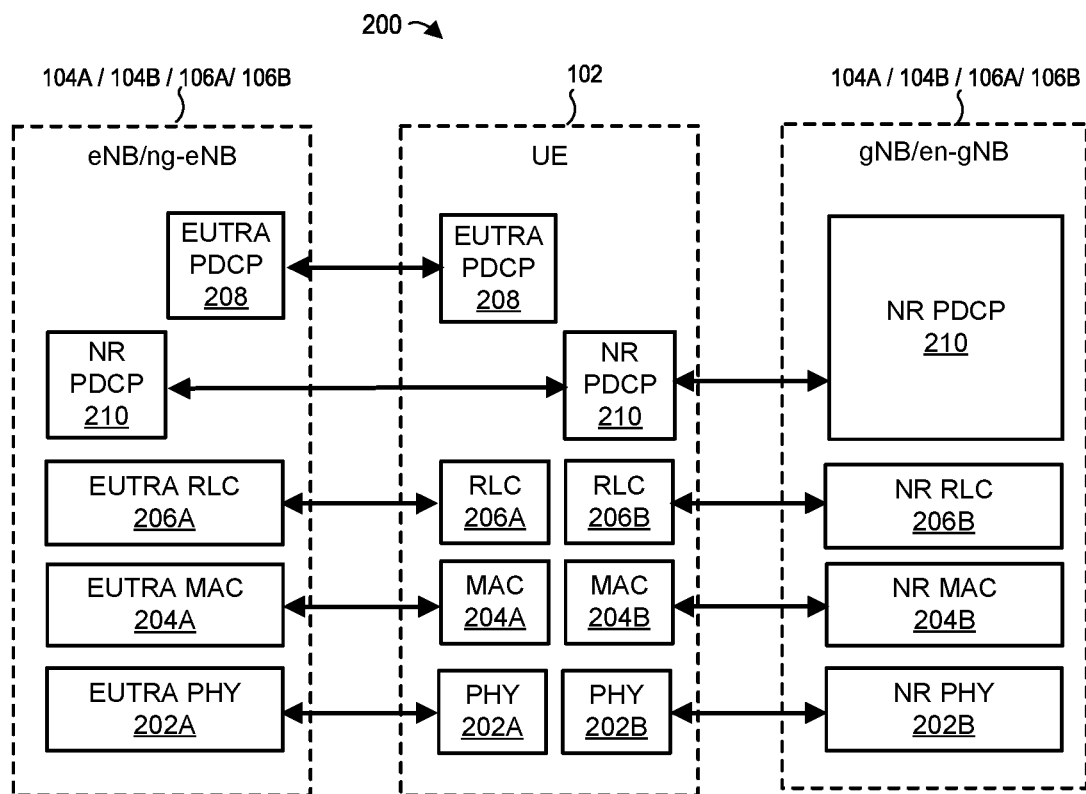
FIG. 2 is a block diagram of an example protocol stack, according to which the UE of FIG. 1A or 1B may communicate with the base stations of FIG. 1A or 1B, respectively.

FIG. 2 illustrates, in a simplified manner, an example radio protocol stack 200 according to which the UE 102 can communicate with an eNB/ng-eNB or a gNB (e.g., one or more of the base stations 104A, 104B, 106A, 106B). In the example stack 200, a PHY 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or support dual connectivity (DC) over EUTRA and NR interfaces. Further, as illustrated in FIG. 2, the UE 102 can support layering of NR PDCP 210 over the EUTRA RLC sublayer 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

FIGS. 3 through 10 illustrate message sequences between the UE 102 and various base stations of the RAN (including base stations 104A, 106A, and/or 104B), for a number of scenarios and implementations relating to the management of conditional handover configurations and/or conditions.

Figure 3:
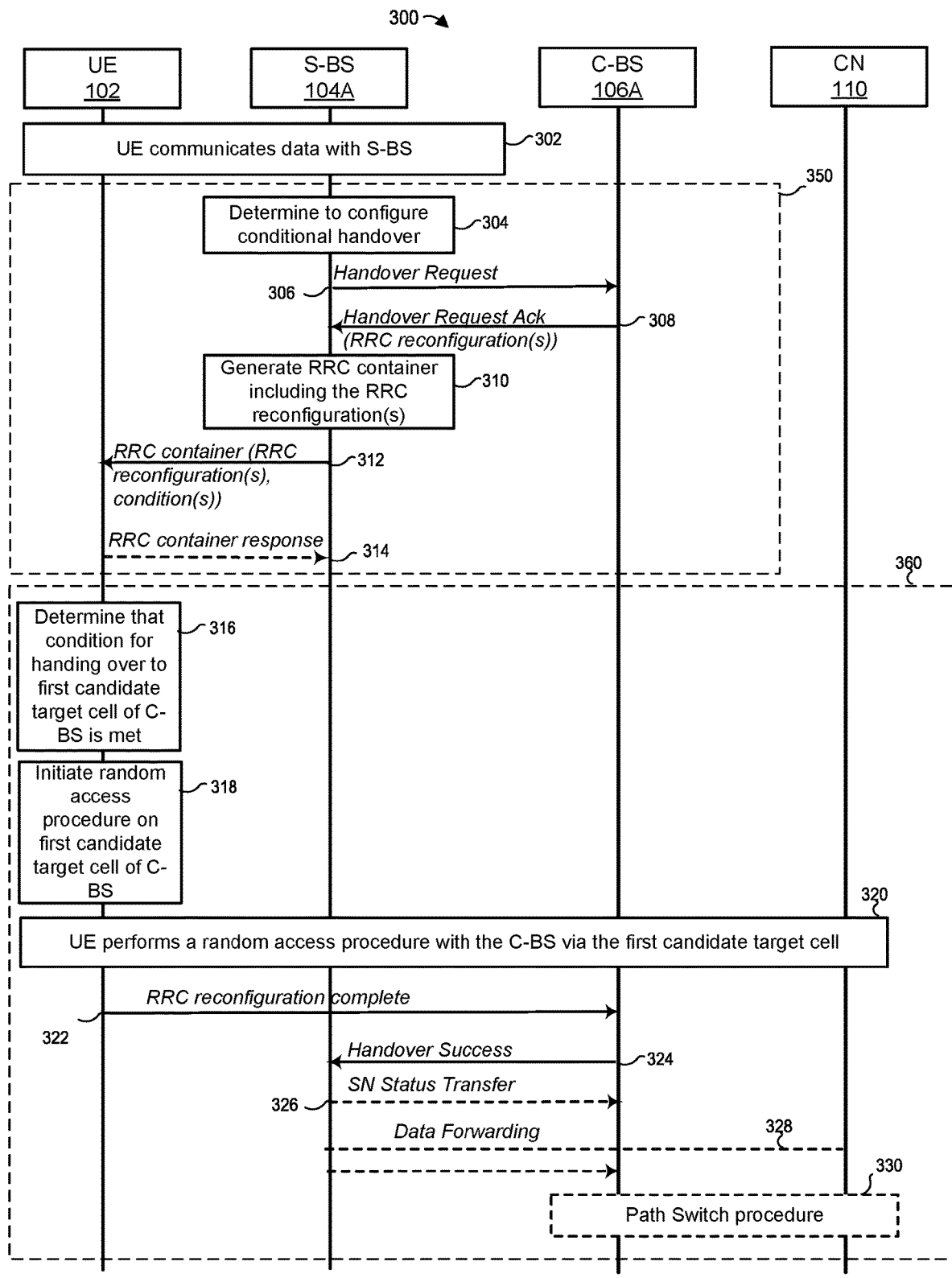
FIG. 3 is an example message diagram corresponding to a scenario and/or implementation in which the RAN provides an RRC container including a conditional handover configuration and corresponding condition(s) to the UE for a conditional handover procedure.
Figure 4:
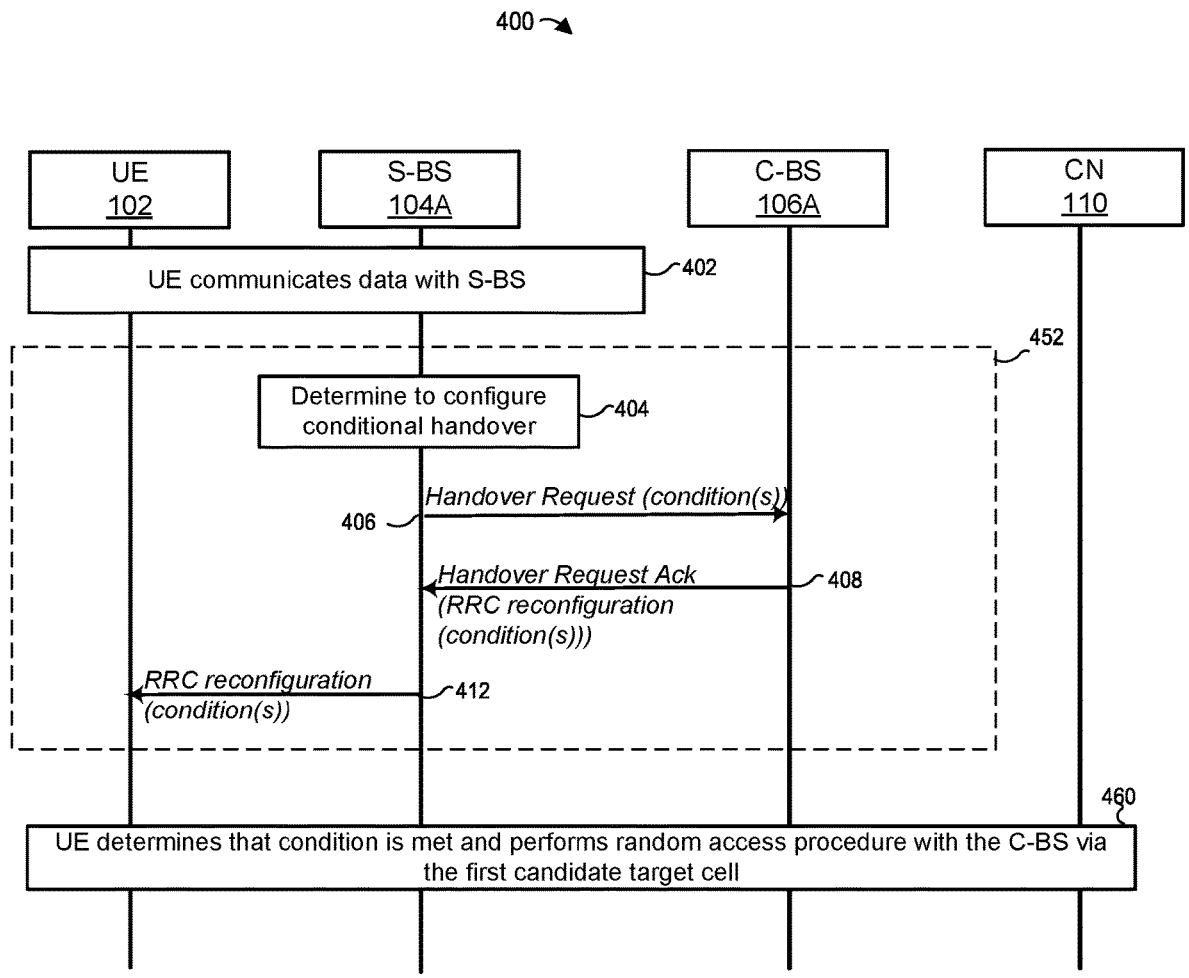
FIG. 4 is an example message diagram corresponding to a scenario and/or implementation in which base stations of the RAN exchange condition(s) corresponding to a conditional handover configuration prior to providing the configuration and the condition(s) to the UE for a conditional handover procedure.
Figure 5:
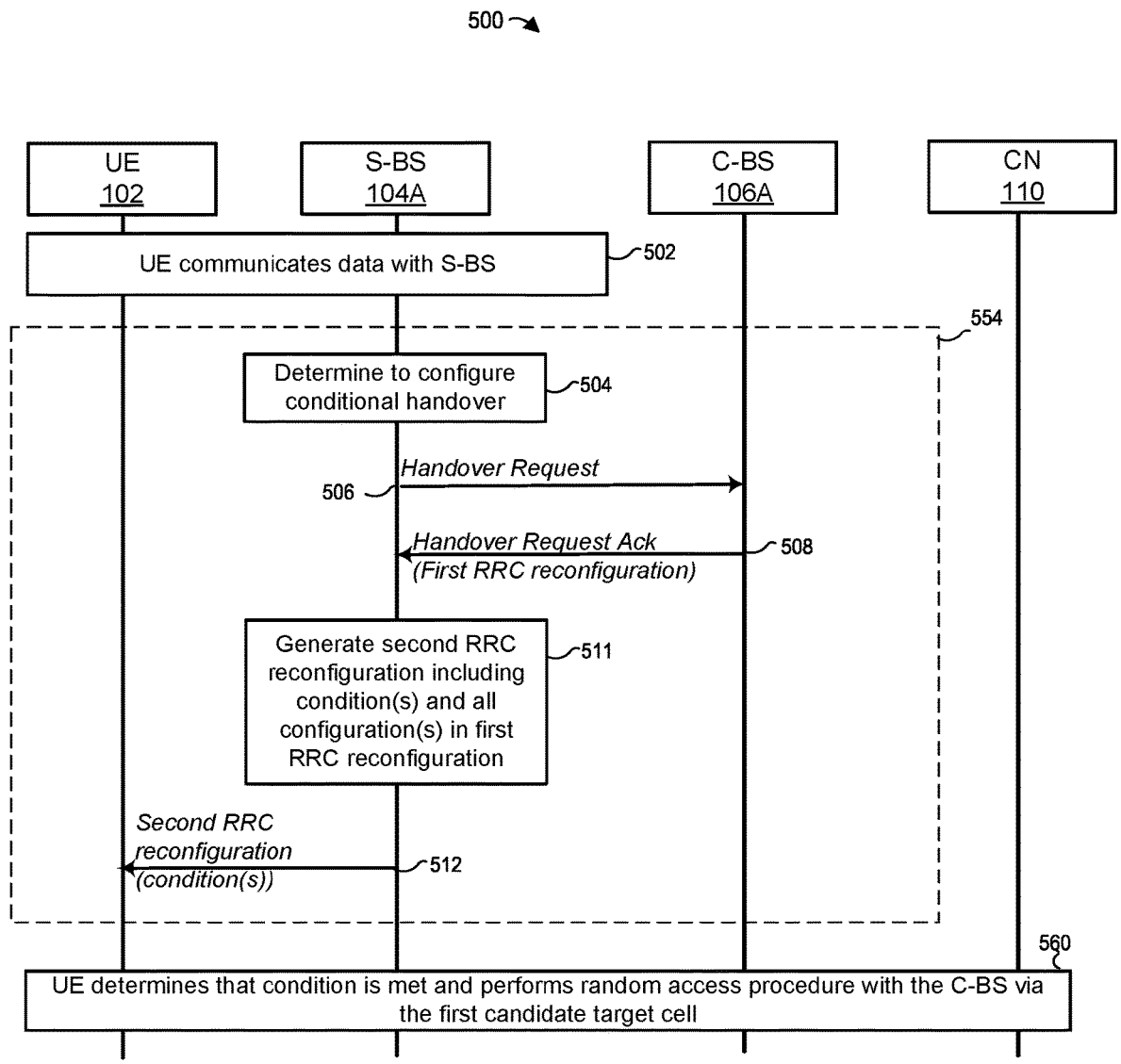
FIG. 5 is an example message diagram corresponding to a scenario and/or implementation in which the source base station generates a new RRC reconfiguration, including a conditional handover configuration from the candidate base station and corresponding condition(s), and transmits the new RRC reconfiguration to the UE for a conditional handover procedure.
Figure 6:
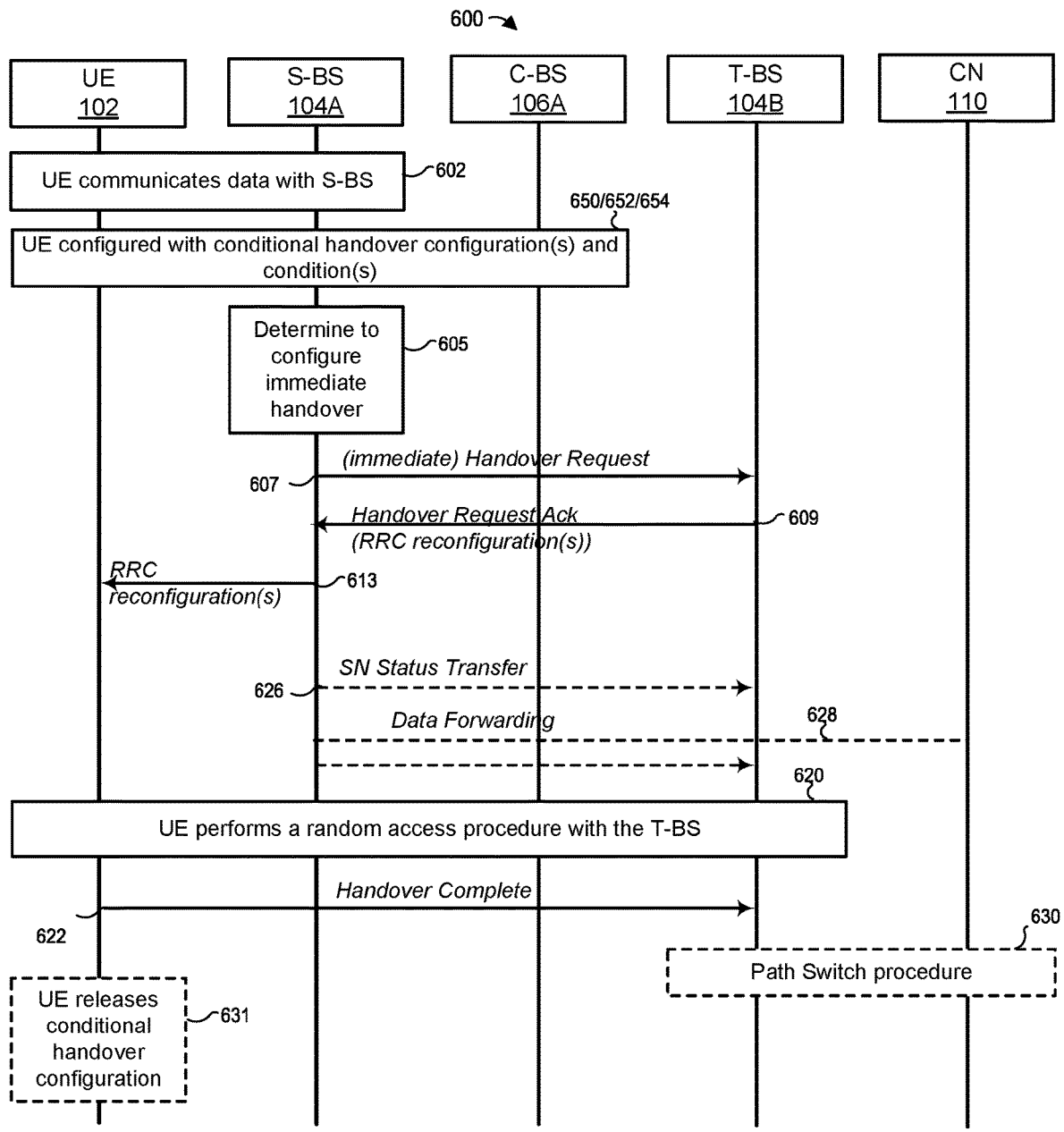
FIG. 6 is an example message diagram corresponding to a scenario and/or implementation in which an immediate handover occurs while the UE is configured for a conditional handover.
Figure 7:
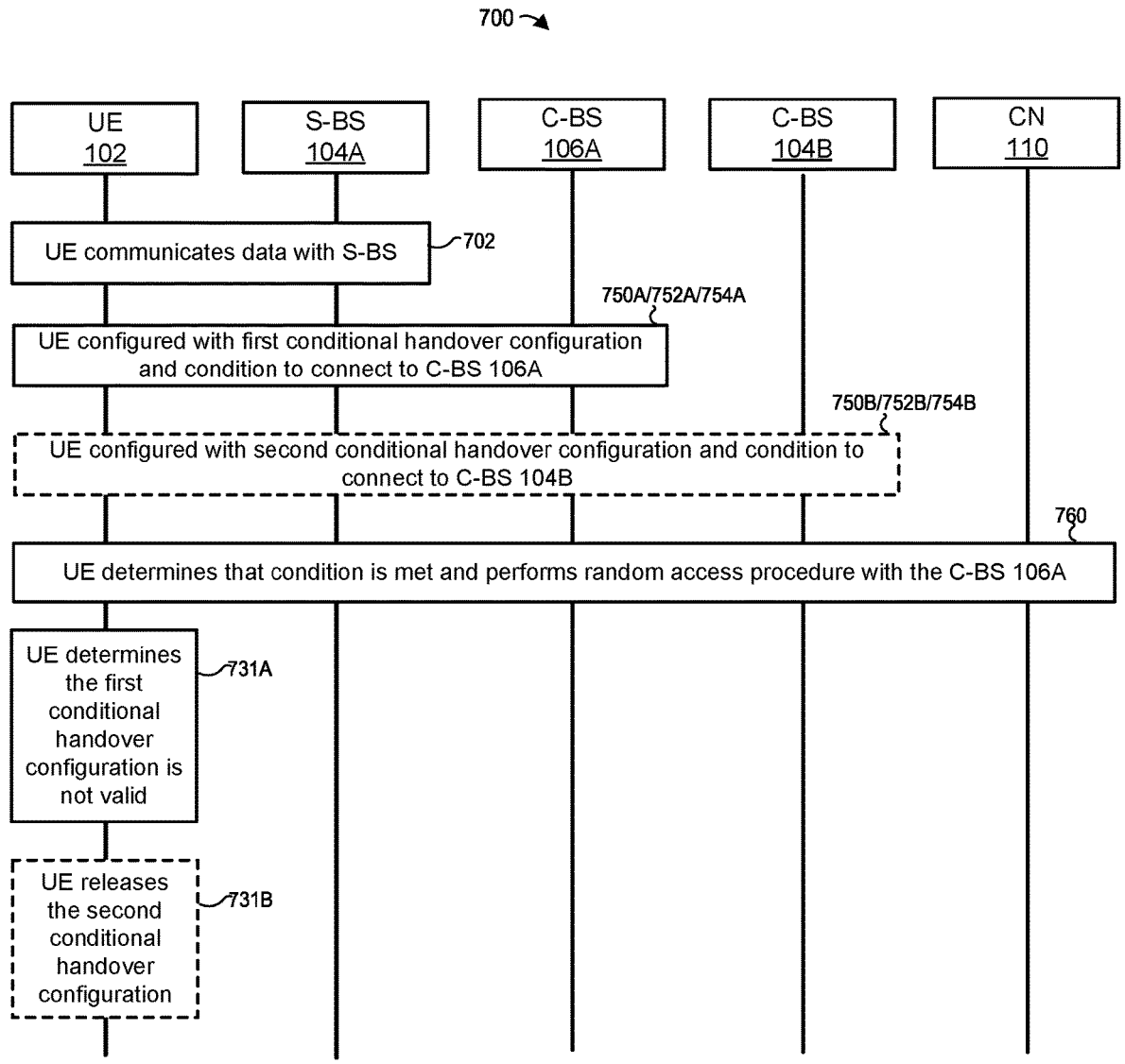
FIG. 7 is an example message diagram corresponding to a scenario and/or implementation in which the UE manages a current set of conditional handover configurations when a condition is satisfied for a conditional handover.
Figure 8:
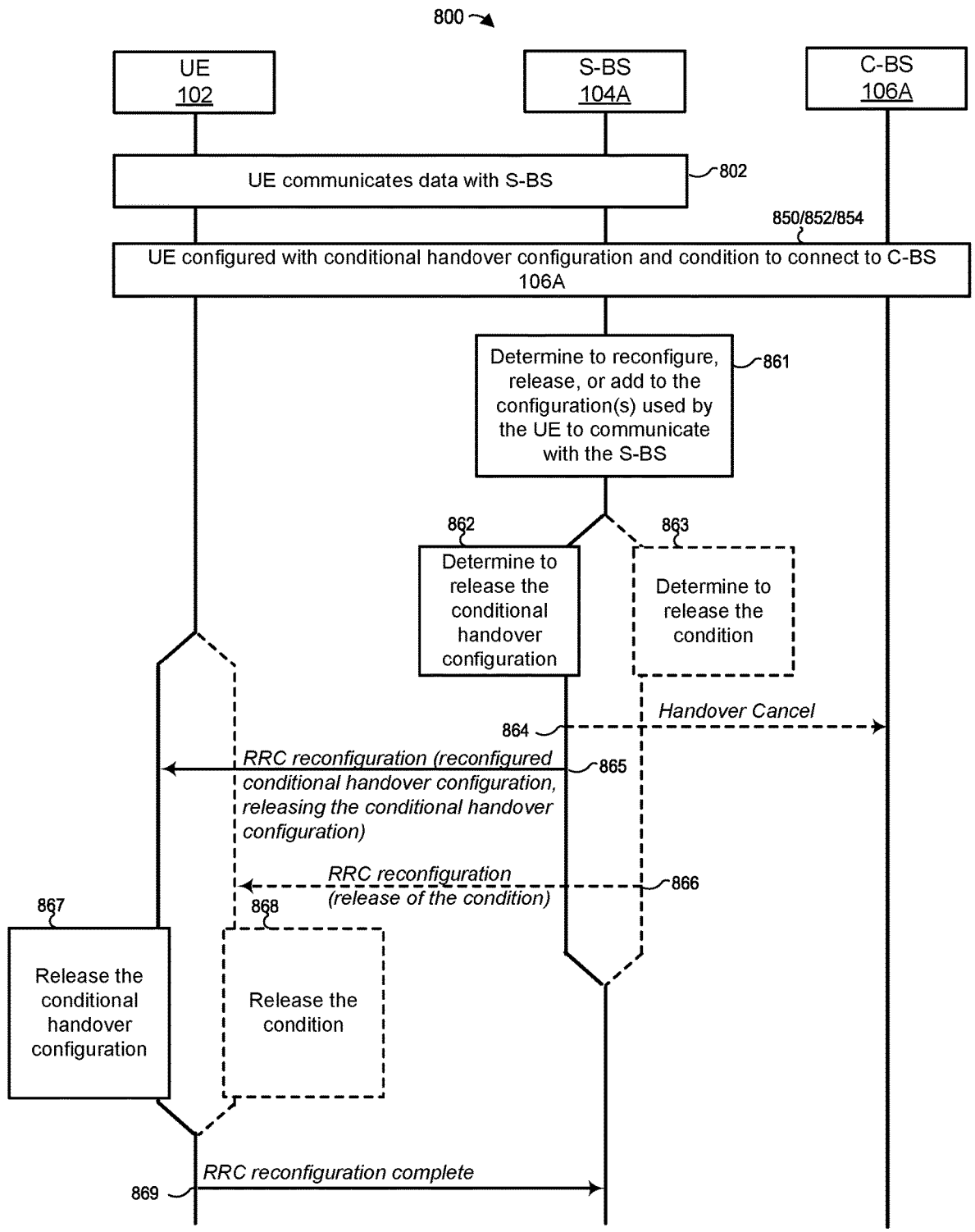
FIG. 8 is an example message diagram corresponding to a scenario and/or implementation in which the RAN reconfigures (e.g., replaces or otherwise modifies) a conditional handover configuration or condition configuration of the UE.
Figure 9:
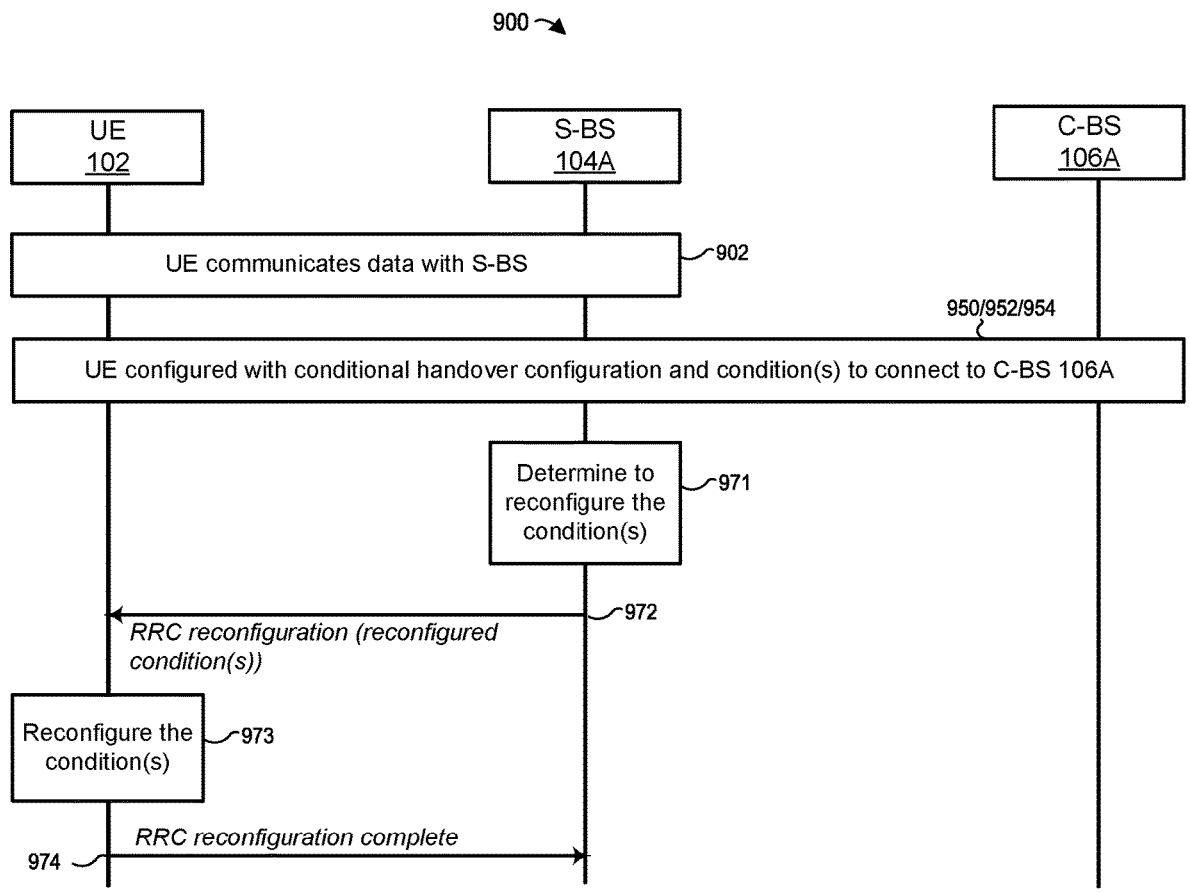
FIG. 9 is an example message diagram corresponding to a scenario and/or implementation in which the RAN reconfigures a condition configuration of the UE.
Figure 10:
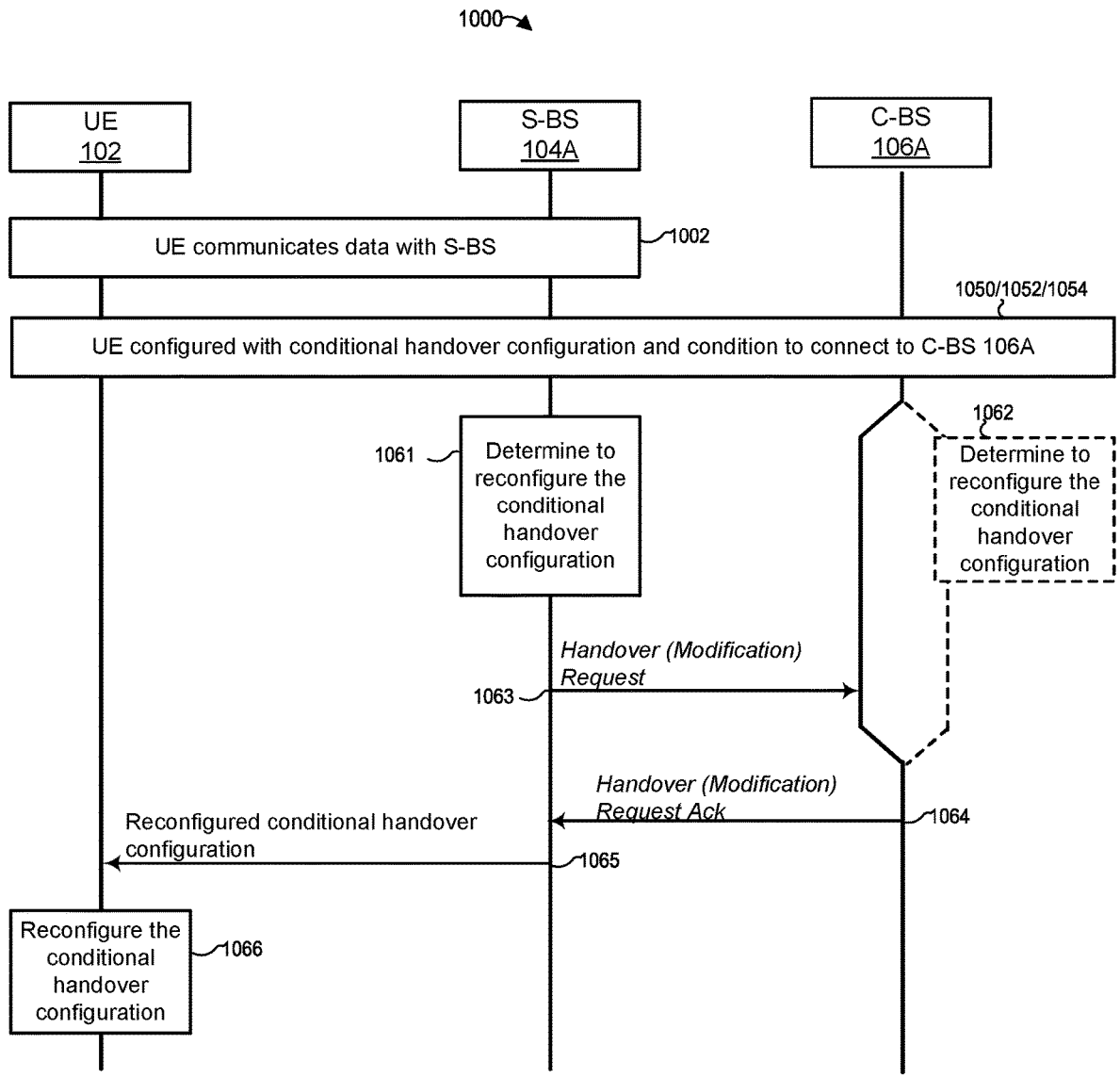
FIG. 10 is an example message diagram corresponding to a scenario and/or implementation in which the RAN reconfigures a conditional handover configuration of the UE.

In particular, FIGS. 3 through 5 depict conditional handover scenarios in which the RAN manages (e.g., exchanges and/or packages) conditional handover configurations and their corresponding conditions in different ways, FIGS. 6 through 8 depict conditional handover scenarios in which the RAN causes the UE 102 to release a conditional handover configuration and/or condition (or otherwise determine that a conditional handover configuration is no longer valid), FIG. 9 depicts a conditional handover scenario in which the RAN reconfigures (e.g., replaces or otherwise modifies) a handover condition that was previously sent to the UE 102, and FIG. 10 depicts a conditional handover scenario in which the RAN reconfigures (e.g., replaces or otherwise modifies) a conditional handover configuration that was previously sent to the UE 102.

Referring first to FIGS. 3 through 5, as noted above, conditional handover scenarios are shown in which the RAN manages (e.g., exchanges and/or packages) conditional handover configurations and their corresponding conditions in different ways.

In FIG. 3, in a conditional handover scenario 300, the base station 104A operates as an S-BS for the UE 102, and the base station 106A operates as a C-BS for the UE 102.

Initially, the UE 102 communicates 302 data (e.g., uplink (UL) data PDUs and/or downlink (DL) data PDUs) with the S-BS 104A. The S-BS 104A then at some point determines 304 to configure a conditional handover to the C-BS 106A for the UE 102, e.g., blindly or in response to detecting a suitable event. For example, the S-BS 104A may perform the determination 304 in response to the S-BS 104A receiving one or more measurement results from the UE 102 that are above (or below) one or more predetermined thresholds, or calculating a filtered result (from the measurement result(s) that are above or below a predetermined threshold). In another example, the suitable event can be that the UE 102 is moving toward the C-BS 106A. In yet another example, the suitable event can be one or more measurement results, generated/obtained by the S-BS 104A measuring signals received from the UE 102, being above (or below) one or more predetermined thresholds.

After determining 304 to configure the conditional handover, the S-BS 104A transmits 306 a Handover Request message to the C-BS 106A. In response to the Handover Request message, the C-BS 106A includes one or more RRC reconfigurations in a conditional handover command message (e.g., an RRC reconfiguration message, possible variations of which are discussed below after the description of the figures), and includes the conditional handover command message in a Handover Request Acknowledge message. The C-BS 106A transmits 308 the Handover Request Acknowledge message to the S-BS 104A in response to the Handover Request message. The RRC reconfiguration(s) can include one or more conditional handover configurations for a first candidate target cell (which may be called a candidate PCell (C-PCell)) of the C-BS 106A. The conditional handover configuration(s) include information that would enable the UE 102 to communicate with the first candidate target cell (e.g., a dedicated random access preamble or a set of random access preambles, physical layer configuration, medium access control configuration, etc.), if a corresponding condition is satisfied.

In response to the Handover Request Acknowledge message, the S-BS 104A generates 310 an RRC container message that includes the RRC reconfiguration(s) and at least one condition corresponding to the RRC reconfiguration(s). The condition(s) may be specific to only the first candidate target cell, or may be specific to multiple (some or all) candidate target cells of the C-BS 106A if more than one cell is a candidate. The S-BS 104A transmits 312 the RRC container message to the UE 102. Upon receiving the RRC container message, the UE 102 can store the RRC reconfiguration(s) and its corresponding condition(s). Optionally, the UE 102 sends 314 an RRC container response message to the S-BS 104A in response to receiving the RRC container message. The events 304, 306, 308, 310, 312, and 314 are collectively referred to in FIG. 3 as the procedure 350.

In one implementation and scenario, the UE 102 determines 316 that at least one of the condition(s) for handing over to the first candidate target cell of C-BS 106A is satisfied, and in response initiates 318 a random access procedure on the first candidate target cell. The UE 102 then performs 320 the random access procedure with the C-BS 106A via the first candidate target cell, in accordance with the conditional handover configuration (e.g., random access preamble(s), etc.) of the RRC container message, and transmits 322 a Handover Complete message (e.g., an RRC reconfiguration complete message) to the C-BS 106A via the candidate target cell, during or after the random access procedure. Because the UE 102 is already configured with RRC reconfiguration(s) and the corresponding condition(s) by the time the UE 102 determines 316 that at least one of the condition(s) is satisfied, the UE 102 is capable of immediately performing 320 the random access procedure to quickly handover to the C-BS 106A, thereby decreasing latency in the handover procedure.

In response to either identifying the UE 102 during the random access procedure or receiving the RRC reconfiguration complete message, the C-BS 106A transmits 324 a Handover Success message to the S-BS 104A, to indicate that the UE 102 is connected to the C-BS 106A. The C-BS 106A becomes the S-BS 106A for the UE 102, and the UE 102 starts communicating data with the S-BS 106A.

In response to receiving 324 the Handover Success message, the S-BS 104A can optionally transmit 326 an SN Status Transfer message to the C-BS 106A, and optionally forward 328 data (e.g., user plane data) received from the CN 110 (e.g., from UPF 162 or S-GW 112) intended for the UE 102 to the S-BS 106A. The S-BS 106A can perform 330 a Path Switch procedure with the CN 110, such that the CN 110 starts sending data to the S-BS 106A instead of the BS 104A. The events 316, 318, 320, 322, 324, 326, 328, and 330 are collectively referred to in FIG. 3 as the procedure 360.

In some implementations, the S-BS 104A may specifically indicate to the C-BS 106A in the Handover Request message that the base station 106A is being requested for purposes of a conditional handover of the UE 102 (i.e., is requested to be a C-BS for the UE 102).

In some implementations, the C-BS 106A may include/add indication(s) in the RRC reconfiguration(s) indicating that the RRC reconfiguration(s) are associated to the C-BS 106A or the first candidate target cell. In other implementations, the S-BS 104A may include/add the indication(s) in the RRC reconfiguration(s) after receiving the RRC reconfiguration(s) from the C-BS 106A. The indication(s) can be field name(s), specific IE(s), or condition(s) associated to the RRC reconfiguration(s), for example.

In some implementations, the RRC container message is an RRC message already used for other purposes, such as an RRCConnectionReconfiguration message or an RRCReconfiguration message. In other implementations, the RRC container message is a new RRC message dedicated for carrying RRC reconfiguration(s) and condition(s) from the S-BS 104A to the UE 102.

In some implementations, the UE 102 uses the condition(s) to evaluate measurement result(s) on a candidate target cell of the C-BS 106A or a serving cell of the S-BS 104A, which may be calculated or filtered by the UE 102. For example, if a condition includes a threshold, the UE 102 can compare its measurement result(s) to the threshold to determine whether the condition is satisfied. In another example, if a condition includes one or more parameters, the UE 102 can determine whether its measurement result(s) and the one or more parameters satisfy another suitable inequality equation (e.g., according to the so-called A3 and/or A5 events defined in 3GPP TS 38.331) to determine whether the condition is satisfied.

In another example, the condition includes a threshold for the UE 102 to compare with its measurement result(s) on a candidate target cell of the C-BS 106A, and a configuration which controls a conditional handover execution probability. For example, the configuration may configure a number, where the number is between 0 and a maximum number. If the UE 102 detects that the measurement result(s) are above the threshold, the UE 102 draws/generates a random number between 0 and the maximum number. If the random number is above (or in other implementations, below) the configured number, the UE 102 hands over to the candidate target cell.

In yet another example, the condition(s) include a first condition and a second condition. The first condition includes a first threshold for the UE 102 to compare with its measurement result(s) on a first candidate target cell of the C-BS 106A, and a configuration which configures a first priority. The second condition includes a second threshold for the UE 102 to compare with its measurement result(s) on a second candidate target cell of the C-BS 106A, and a configuration which configures a second priority that is above the first priority. If the UE 102 determines that the measurement result(s) on the first candidate target cell are above both the first and second thresholds, the UE 102 hands over to the second candidate target cell because the second priority is above the first priority.

In a scenario in which the UE 102 transmits 314 an RRC container response message to the S-BS 104A in response to receiving the RRC container, in one implementation, the UE 102 can set a value of a transaction identifier in the RRC container response message to a value of a transaction identifier in the RRC container message if the RRC container message and the RRC container response message included the transaction identifiers. In some implementations, the RRC container response message is an RRC message already used for other purposes, such as an RRC-ConnectionReconfigurationComplete message or an RRCReconfigurationComplete message. In other implementations, the RRC container response message is a new/dedicated RRC response message.

In some implementations, the RRC reconfiguration complete message is associated to the conditional handover command message (e.g., the RRC reconfiguration message) that is included in the Handover Request Acknowledge message. In some implementations, the RRC reconfiguration message includes configurations for the UE 102 to perform the random access procedure with the C-BS 106A and to communicate with the C-BS 106A via the first candidate target cell. In one implementation, the UE 102 sets a value of a transaction identifier in the RRC reconfiguration complete message to a value of a transaction identifier in the RRC reconfiguration message, so that the C-BS 106A can determine that the RRC reconfiguration complete message is responsive to the RRC reconfiguration message.

In some implementations, the UE 102 transmits 322 the RRC reconfiguration complete message in a message 3 (Msg3) or in a message A (MsgA) while performing the random access procedure if the random access procedure is a 4-step random access procedure or a 2-step random access procedure, respectively. In other implementations, the UE 102 transmits 322 the RRC reconfiguration complete message on a physical uplink shared channel (PUSCH) after performing the random access procedure.

In some implementations, the C-BS 106A can generate an identifier or identity (ID) of the UE 102 and includes the ID in the RRC reconfiguration(s). In turn, the UE 102 includes the ID in a MAC PDU, and includes the MAC PDU in the Msg3 or the MsgA. The UE 102 transmits the Msg3 or MsgA to the C-BS 106A during the random access procedure, so that the C-BS 106A can identify the UE 102. In other embodiments, the UE 102 may select a dedicated random access preamble in the set of random access preambles in the RRC reconfiguration(s) and transmits the selected random access preamble in the random access procedure. The C-BS 106A identifies the UE 102 based on the dedicated random access preamble received from the UE 102 during the random access procedure. In such embodiments, the C-BS 106A can configure the dedicated random access preamble in a random access configuration and includes the random access configuration in the RRC reconfiguration(s).

In some implementations, the C-BS 106A consists of a CU (e.g., CU 172) and one or more DUs (e.g., DU(s) 174), as shown in FIG. 1C. The DU(s) may perform the random access procedure with the UE 102 and identify the UE 102 during the random access procedure. The CU exchanges messages with the S-BS 104A as shown in FIG. 3 (e.g., events 306, 308, 324, 326). In some implementations, the CU generates the ID of the UE 102 and includes the ID in the RRC reconfiguration(s). In other implementations, the CU configures a dedicated random access preamble in a random access configuration and includes the random access configuration in the RRC reconfiguration(s). In yet other implementations, the CU configures the set of random access preamble in a random access configuration and includes the random access configuration in the RRC reconfiguration(s). In some implementations, the DU generates the ID and sends the ID to the CU, which in turn includes the ID in the RRC reconfiguration(s). In other implementations, the DU configures a dedicated random access preamble in a random access configuration, includes the random access configuration in the RRC reconfiguration(s), and sends the RRC reconfiguration(s) to the CU. In other implementations, the DU configures a dedicated random access preamble in a random access configuration, and sends the random access configuration to the CU, which in turn includes the random access configuration in the RRC reconfiguration(s). In yet other implementations, the UE 102 and the C-BS 106A receive the ID from the S-BS 104A or CN 110. The ID above can be a RAN identity or a CN identity. For example, the ID can be a cell-radio network temporary identifier (C-RNTI), a Temporary Mobile Subscriber Identity (S-TMSI), or a 5G S-TMSI.

In some implementations, the RRC reconfiguration(s) can include one or more cell group configuration (CellGroupConfig) information elements (IEs) that configure one or more candidate target cells. For example, each of the RRC reconfiguration(s) can include a CellGroupConfig configuring the first candidate target cell. In another example, the RRC reconfiguration(s) can include more than one CellGroupConfig IEs configuring one or more candidate target cells. The CellGroupConfig IE may be as defined in 3GPP TS 38.331, for example. In other implementations, each of the RRC reconfiguration(s) is an RRCReconfiguration message as defined in 3GPP TS 38.331, for example. In some implementations, the RRC reconfiguration(s) can include a radio bearer configuration (RadioBearerConfig).

In some implementations, the RRC reconfiguration(s) can include one or more RRCConnectionReconfiguration-r8-IEs configuring one or more candidate target cells. For example, each of the RRC reconfiguration(s) can include an RRCConnectionReconfiguration-r8-IEs configuring the first candidate target cell. In another example, the RRC reconfiguration(s) can include more than one RRCConnectionReconfiguration-r8-IEs configuring one or more candidate target cells. The RRCConnectionReconfiguration-r8-IEs may be as defined in 3GPP TS 36.331, for example. In other implementations, each of the RRC reconfiguration(s) is an RRCConnectionReconfiguration message, as defined in 3GPP TS 36.331, for example. In other implementations, the RRC reconfiguration(s) can include one or more groups of IEs configuring one or more candidate target cells. Each of the groups can include a MobilityControlInfo IE, a RadioResourceConfigDedicated IE, and a SecurityConfigHO IE, for example.

Turning now to FIG. 4, in a conditional handover scenario 400, the base station 104A again operates as an S-BS for the UE 102, and the base station 106A again operates as a C-BS for the UE 102. In the implementation and scenario of FIG. 4, and unlike the implementation and scenario of FIG. 3, the S-BS 104A informs the C-BS 106A of the condition(s) for a conditional handover before providing the condition(s), or modified (e.g., replacement) versions thereof, to the UE 102.

Initially, the UE 102 communicates 402 data (e.g., UL data PDUs and/or DL data PDUs) with the S-BS 104. The S-BS 104A then at some point determines 404 to configure a conditional handover to the C-BS 106A for the UE 102, e.g., blindly or in response to detecting a suitable event. Event 404 may be similar to event 304 of FIG. 3, for example.

In response to the determination 404, the S-BS 104A includes the condition(s) for the conditional handover in a Handover Request message, and transmits 406 the Handover Request message to the C-BS 106A. The condition(s) may otherwise be similar to the condition(s) discussed above with reference to FIG. 3, for example.

In response to the Handover Request message, the C-BS 106A includes one or more RRC reconfigurations and the condition(s) in a conditional handover command message (e.g., an RRC reconfiguration message), and includes the conditional handover command message in a Handover Request Acknowledge message. The C-BS 106A transmits 408 the Handover Request Acknowledge message to the S-BS 104A in response to the Handover Request message. Whereas in FIG. 3 the S-BS 104A uses an RRC container message (at events 310 and 312), in FIG. 4 the S-BS 104A transmits 412 the conditional handover command message to the UE 102 without an RRC container, in response to the Handover Request Acknowledge message. The events 404, 406, 408, and 412 are collectively referred to in FIG. 4 as the procedure 452.

In one implementation and scenario, the UE 102 determines that a condition for handing over to a first candidate target cell of C-BS 106A is satisfied, and in response initiates and performs a random access procedure on the first candidate target cell, in a procedure 460. The procedure 460 may be similar to the procedure 360 of FIG. 3, for example.

In some implementations, the C-BS 106A checks the condition(s) for conditional handover received in the Handover Request message to determine whether to accept the Handover Request message (e.g., whether the condition(s) themselves are acceptable to the C-BS 106A). If the C-BS 106A determines that the condition(s) are too "loose," the C-BS 106A may send 408 a Handover Reject message or a Handover Preparation Failure message to the S-BS 104A, instead of sending 408 the Handover Request Acknowledge message. For example, the condition(s) may be too "loose" if a threshold that is configured by the S-BS 104A is too low, and therefore would result in one or more measurement results obtained by the UE 102 (when performing measurements on the candidate target cell 126A) frequently being above the threshold. Otherwise (i.e., if the C-BS 106A determines that the condition(s) are acceptable), the C-BS 106A sends 408 the Handover Request Acknowledge message to the S-BS 104A.

In some implementations, the C-BS 106A checks the condition(s) for conditional handover received in the Handover Request message, and negotiates the condition(s) with the S-BS 104A. The C-BS 106A may modify the condition(s), and send 408 an interface message including the modified condition(s) to the S-BS 104A. The S-BS 104A can either reject the modified condition(s) by sending a Handover Cancel message to the C-BS 106A, or accept the modified condition(s) by sending another (second) Handover Request message including the modified condition(s) to the C-BS 106A. In response, the C-BS 106A includes the modified condition(s) in the conditional handover command message (e.g., an RRC reconfiguration message), and includes the conditional handover command message in the Handover Request Acknowledge message.

In FIG. 5, in a conditional handover scenario 500, the base station 104A again operates as an S-BS for the UE 102, and the base station 106A again operates as a C-BS for the UE 102. In the implementation of FIG. 5, unlike FIG. 4, no exchange of conditions occurs between the S-BS 104A and C-BS 106A, and the S-BS 104A generates a new RRC reconfiguration message rather than forwarding the (containerized or non-containerized) RRC reconfiguration message from the C-BS 106A to the UE 102 as in FIGS. 3 and 4.

Initially, the UE 102 communicates 502 data (e.g., UL data PDUs and/or DL data PDUs) with the S-BS 104. The S-BS 104A then at some point determines 504 to configure a conditional handover to the C-BS 106A for the UE 102, e.g., blindly or in response to detecting a suitable event. Event 504 may be similar to event 304 of FIG. 3, for example.

After determining 504 to configure the conditional handover, the S-BS 104A transmits 506 a Handover Request message to the C-BS 106A. In response, the C-BS 106A includes one or more RRC reconfigurations in a conditional handover command message (e.g., a first RRC reconfiguration message), includes the conditional handover command message in a Handover Request Acknowledge message, and transmits 508 the Handover Request Acknowledge message to the S-BS 104A. Events 504, 506 and 508 may be similar to events 304, 306 and 308 of FIG. 3, for example.

In response to the Handover Request Acknowledge message, the S-BS 104A extracts all the RRC reconfiguration(s) from the first RRC reconfiguration message and generates 511 a second RRC reconfiguration message including the condition(s) and the extracted RRC reconfiguration(s). The condition(s) themselves may be similar to the condition(s) discussed above with reference to FIG. 3 or FIG. 4, for example.

The S-BS 104A transmits 512 the second RRC reconfiguration message to the UE 102. The events 504, 506, 508, 511, and 512 are collectively referred to in FIG. 5 as the procedure 554.

In one implementation and scenario, the UE 102 determines that a condition for handing over to a first candidate target cell of C-BS 106A is satisfied, and in response initiates and performs a random access procedure on the first candidate target cell, in a procedure 560. The procedure 560 may be similar to the procedure 360 of FIG. 3, for example.

In some implementations, the S-BS 104A sets a transaction identifier in the second RRC reconfiguration message to a value of a transaction identifier in the first RRC reconfiguration message. In other implementations, the S-BS 104A directly includes the condition(s) that were in the first RRC reconfiguration message into the second RRC reconfiguration message. In yet other implementations, the S-BS 104A generates and directly includes the condition(s) into the second RRC reconfiguration message.

Referring to FIGS. 6 through 8, as noted above, conditional handover scenarios are shown in which the RAN causes the UE 102 to release a conditional handover configuration and/or condition (or otherwise determine that a conditional handover configuration is no longer valid).

In FIG. 6, in a conditional handover scenario 600, the base station 104A operates as an S-BS for the UE 102, the base station 106A operates as a C-BS for the UE 102, and the base station 104B operates as a target base station (T-BS) for the UE 102. In the scenario 600, the S-BS 104A determines to configure an immediate handover to the T-BS 104B for the UE 102 while the UE 102 is configured for a conditional handover.

Initially, the UE 102 communicates 602 data (e.g., UL data PDUs and/or DL data PDUs) with the S-BS 104A. The S-BS 104A then at some point determines to configure a conditional handover to the C-BS 106A for the UE 102, in a procedure 650/652/654. The procedure 650/652/654 may be similar to any one of the procedures 350, 452, or 554 of FIG. 3, 4, or 5, respectively, for example.

In one implementation and scenario, prior to the UE 102 determining that a condition for handing over to a first candidate target cell of C-BS 106A is satisfied, the S-BS 104A determines 605 to configure an immediate handover to a target cell of the T-BS 104B for the UE 102. The S-BS 104A may determine 605 to configure the immediate handover in response to receiving measurement result(s) of the target cell from the UE 102 and determining that the measurement result(s) satisfy a certain threshold, for example. After determining 605 to configure the immediate handover, the S-BS 104A transmits 607 an (immediate) Handover Request message to the T-BS 104B. In response to the (immediate) Handover Request message, the T-BS 104B includes one or more RRC reconfigurations in a handover command message (e.g., an RRC reconfiguration message), and includes the handover command message in a Handover Request Acknowledge message. The T-BS 104B transmits 609 the Handover Request Acknowledge message to the S-BS 104A in response to the (immediate) Handover Request message.

In response to the Handover Request Acknowledge message, the S-BS 104A transmits 613 the handover command message containing the RRC reconfiguration(s) to the UE 102. Upon receiving the handover command message, the UE 102 immediately reacts to the handover command message, by attempting to connect to the T-BS 104B. To connect to the T-BS 104B, the UE 102 performs 620 a random access procedure via the target cell of the T-BS 104B, and then transmits 622 a Handover Complete message (e.g., an RRC reconfiguration complete message) to the T-BS 104B. After the UE 102 successfully completes the random access procedure and/or transmits the Handover Complete message, the T-BS 104B becomes the S-BS 104B for the UE 102, and the UE 102 starts communicating data with the S-BS 104B.

In some implementations, the UE 102 transmits 622 the RRC reconfiguration complete message in a Msg3 or in a MsgA while performing the random access procedure if the random access procedure is a 4-step random access procedure or a 2-step random access procedure, respectively. In other implementations, the UE 102 transmits 622 the RRC reconfiguration complete message on a PUSCH after performing the random access procedure.

In some implementations, the determination 605 by the S-BS 104A that the UE 102 should perform an immediate handover procedure supersedes the previously initiated conditional handover procedure (e.g., renders the conditional handover procedure unnecessary). Thus, the UE 102 releases 631 the conditional handover configuration after the immediate handover to the T-BS 104B. This prevents the UE 102 from unnecessarily storing and/or accounting for the conditional handover configuration and its corresponding condition. In such implementations, the UE 102 may be configured to release 631 the conditional handover configuration in response to receiving the handover command message at event 613, or after successfully performing 620 the random access procedure. In some implementations, the handover command message may include an indication (e.g., field or an IE) to release the conditional handover configuration. In other implementations, the UE 102 may autonomously release 631 the conditional handover configuration regardless of whether the handover command message includes such an indication.

Similarly, the C-BS 106A may also unnecessarily be storing and/or accounting for the conditional handover configuration. Accordingly, in some implementations, the S-BS 104A determines to instruct the C-BS 106A to release the conditional handover configuration in response to the immediate handover of the UE 102 to the T-BS 104B (e.g., in response to receiving a Handover Success message from the T-BS 104B). In one such implementation, after the immediate handover of the UE 102 to the T-BS 104B, the S-BS 104A sends a Handover Cancel Request message, or alternatively, a Handover Cancel message, to the C-BS 106A. In turn, the C-BS 106A releases the conditional handover configuration. The C-BS 106A can optionally send a Handover Cancel Response message to the S-BS 104A in response to the Handover Cancel Request message. In another such implementation, instead of releasing the conditional handover configuration in response to the Handover Cancel Request message or Handover Cancel message, the C-BS 106A automatically releases the conditional handover configuration if the C-BS 106A does not connect to the UE 102 within a certain time period threshold. The C-BS 106A can specify the time period threshold, or receive the time period threshold from the S-BS 104A in the Handover Request message during procedure 650/652/654.

In some implementations, similar to the communications among S-BS 104A, C-BS 106A, and CN 110 discussed above with reference to FIG. 3, in FIG. 6 the S-BS 104A can optionally transmit 626 an SN Status Transfer message to the T-BS 104B, and optionally forward 628 data received from the CN 110 intended for the UE 102 to the T-BS 104B, after receiving 609 the Handover Request Acknowledge message. Events 626, 628 may occur before event 620, as depicted in FIG. 6, or after event 622, for example. The T-BS 104B can perform 630 a Path Switch procedure with the CN 110, such that the CN 110 starts sending data to the T-BS 104B instead of the S-BS 104A.

In some implementations, in response to receiving the handover command message at event 613, and to communicate data with the T-BS 104B, the UE 102 derives a security key (e.g., $K_{eNB}$ or $K_{gNB}$) associated to the T-BS 104B, e.g., from a security key (e.g., $K_{eNB}$ or $K_{gNB}$) associated to the S-BS 104A or from another security key (e.g., $K_{AMF}$ or NH). The UE 102 derives at least one ciphering key (e.g., $K_{RRCenc}$, $K_{UPenc}$) and at least one integrity key (e.g., $K_{RRCint}$, $K_{UPint}$) from the security key associated to the T-BS 104B. The UE 102 communicates data with the T-BS 104B using the derived at least one ciphering key (e.g., $K_{RRCenc}$, $K_{UPenc}$) and/or at least one integrity key (e.g., $K_{RRCint}$, $K_{UPint}$).

In some implementations, instead of releasing 631 the conditional handover configuration after handover to the T-BS 104B, the UE 102 keeps the conditional handover configuration received from the C-BS 106A, and also keeps a security key (e.g., $K_{eNB}$ or $K_{gNB}$) associated to the S-BS 104A. In this way, if the UE 102 detects a condition for handing over to the first candidate target cell of the C-BS 106A, the UE 102 is still able to perform conditional handover to the C-BS 106A according to the kept conditional handover configuration, and then communicate data with the C-BS 106A using the security key. If the UE 102 hands over to the C-BS 106A, the UE 102 can derive a security key associated to the C-BS 106A from the security key associated to the S-BS 104A instead of the security key associated to the T-BS 104B. Then, the UE 102 derives at least one ciphering key (e.g., $K_{RRCenc}$, $K_{UPenc}$) and at least one integrity key (e.g., $K_{RRCint}$, $K_{UPinc}$) from the security key associated to the C-BS 106A. In one implementation, the C-BS 106A receives the same security key (e.g., $K_{eNB}$ or $K_{gNB}$) as that of the UE 102 from the S-BS 104A, and uses the security key to derive the same ciphering key(s) (e.g., $K_{RRCenc}$, $K_{UPenc}$) and integrity key(s) (e.g., $K_{RRCint}$, $K_{UPinc}$) as derived by the UE 102. In another implementation, instead of deriving the ciphering key(s) and integrity key(s) from the security key, the C-BS 106A receives the ciphering key(s) and integrity key(s) from the S-BS 104A, either directly (e.g., via X2/Xn interface) or indirectly (e.g., via S1/NG interface).

In other implementations, instead of keeping the security key (e.g., $K_{eNB}$ or $K_{gNB}$) associated to the S-BS 104A, deriving the security key associated to the C-BS 106A from the security key associated to the S-BS 104A, and deriving the ciphering key(s) and integrity key(s) from the security key associated to the C-BS 106A, the UE 102 derives a security key (e.g., $K_{eNB}$ or $K_{gNB}$) from a security configuration included in the conditional handover configuration received from the C-BS 104B, and subsequently derives the ciphering key(s) and integrity key(s) from the security key. The C-BS 106A can derive the same ciphering key(s) and integrity key(s) in a similar manner.

In some scenarios, the UE 102 may fail to handover to the T-BS 104B, e.g., due to failing the random access procedure with the T-BS 104B via the target cell or expiration of a handover guarding timer (e.g., T304) for executing the immediate handover. The UE 102 may perform an RRC reestablishment procedure (e.g., RRC Connection Reestablishment procedure as specified in 3GPP Technical Specification 36.331 or RRC Reestablishment procedure as specified in 3GPP Technical Specification 38.331). In such scenarios, the UE 102 may either keep or release the conditional handover configuration received from the S-BS 104A, as discussed above. The UE 102 may also release any secondary cell(s) (SCell(s)) if configured. In these scenarios, the UE 102 may keep or release measurement configuration(s) in response to the RRC reestablishment procedure. For example, in response to the RRC reestablishment procedure, the UE 102 may keep a first measurement configuration and release a second measurement configuration, keep all of the measurement configuration(s), or release all of the measurement configuration(s).

Turning now to FIG. 7, in a conditional handover scenario 700 the base station 104A operates as an S-BS for the UE 102, the base station 106A operates as a C-BS for the UE 102, and the base station 104B operates as another C-BS for the UE 102. In the scenario 700, the UE 102 manages a current set of conditional handover configurations when a condition is satisfied for a conditional handover.

Initially, the UE 102 communicates 702 data (e.g., UL data PDUs and/or DL data PDUs) with the S-BS 104A. The S-BS 104A then at some point determines to configure a first conditional handover, and configures the UE 102 with a first conditional handover configuration and one or more corresponding first conditions, for a first conditional handover to the C-BS 106A, in procedure 750A/752A/754A. In one implementation and scenario, the S-BS 104A may also determine to configure the UE 102 with a second conditional handover configuration and one or more corresponding second conditions, for a second conditional handover to the C-BS 104B, in procedure 750B/752B/754B. Each of the procedures 750A/752A/754A and 750B/752B/754B may be similar to any one of the procedures 350, 452, or 554 of FIG. 3, 4, or 5, respectively. Accordingly, the S-BS 104A may configure the UE 102 with multiple conditional handover configurations to be used for conditional handover to different candidate base stations.

The UE 102 then detects that the condition(s) corresponding to the first conditional handover is/are satisfied, and hands over to the C-BS 106A via a first candidate target cell, in procedure 760. The procedure 760 may be similar to any one of the procedures 360, 460, or 560 of FIG. 3, 4, or 5, respectively. Accordingly, the C-BS 106A becomes the S-BS 106A for the UE 102, and the UE 102 starts communicating data with the S-BS 106A.

In some implementations, the UE 102 determines 731A that the first conditional handover configuration is no longer valid for conditional handover because the first conditional handover configuration has already been used by the UE 102 to handover to the S-BS 106A during procedure 760. Thus, if the UE 102 later on detects a failure (e.g., radio link failure) on a communication link with the S-BS 106A and selects back to the first candidate target cell associated to the first conditional handover configuration, the UE 102 will not hand over to the S-BS 106A using the first conditional handover configuration. In other implementations, rather than the UE 102 determining 731A that the first conditional handover configuration is no longer valid, the S-BS 106A may determine that the first conditional handover configuration is no longer valid. Thus, if the UE 102 attempts to select back to the first candidate target cell and perform the random access procedure with the S-BS 106A, the S-BS 106A can identify the UE 102 during the random access procedure and prevent the UE 102 from handing over to the S-BS 106A using the first conditional handover configuration. In one implementation, the S-BS 106A can transmit a handover reject message to the UE 102, e.g., during or after the random access procedure, to prevent the UE 102 from handing over to the S-BS 106A. In another implementation, the S-BS 106A does not respond to the UE 102 after identifying the UE 102 during the random access procedure.

In some implementations, if the UE 102 hands over to the C-BS 106A and thereby renders the second conditional handover configuration (if configured by the S-BS 104A in procedure 750B/752B/754B) unnecessary, the UE 102 releases 731B the second conditional handover configuration, similar to the manner of releasing 631 the conditional handover configuration discussed above with reference to FIG. 6. Moreover, the S-BS 104A may instruct the C-BS 104B to release the second conditional handover configuration in response to the handover of the UE 102 to the C-BS 106A, similar to the manner in which the S-BS 104A instructs the C-BS 106A to release the conditional handover configuration in response to the handover of the UE 102 to the T-BS 104B, as discussed above with reference to FIG. 6.

In some implementations, after the UE 102 hands over to the C-BS 106A via the first candidate target cell in procedure 760, the UE 102 communicates data with the C-BS 106A using derived ciphering key(s) and/or integrity key(s), similar to the manner in which the UE 102 communicates data with the T-BS 104B, as discussed above with reference to FIG. 6.

In some implementations, instead of releasing 731B the second conditional handover configuration after handover to the C-BS 106A, the UE 102 keeps the second conditional handover configuration received from the C-BS 104B, and also keeps a security key associated to the S-BS 104A, similar to the manner in which the UE 102 can keep the conditional handover configuration received from the C-BS 106A and the security key associated to the S-BS 104A, as discussed above with reference to FIG. 6.

In some scenarios, the UE 102 may fail to handover to the C-BS 106A (e.g., due to failing the random access procedure with the C-BS 106A via the first candidate target cell). In such scenarios, the UE 102 may either keep or release the first conditional handover configuration, and keep the second conditional handover configuration so that the UE 102 is still able to perform handover to the C-BS 104B using the second conditional handover configuration.

Turning now to FIG. 8, in a conditional handover scenario 800, the base station 104A operates as an S-BS for the UE 102, and the base station 106A operates as a C-BS for the UE 102. Unlike the implementations and scenarios of FIGS. 6 and 7 in which the UE 102 decides to release a conditional handover configuration that is rendered unnecessary as a result of the UE 102 successfully handing over to a base station (e.g., T-BS 104B, C-BS 106A), in this implementation and scenario 800, the S-BS 104A instructs the UE 102 to release a conditional handover configuration to prevent the UE 102 from attempting to handover to C-BS 106A.

Initially, the UE 102 communicates 802 data (e.g., UL data PDUs and/or DL data PDUs) with the S-BS 104A. The S-BS 104A then at some point determines to configure a conditional handover, and configures the UE 102 with at least one conditional handover configuration, and one or more corresponding conditions, for conditional handover to the C-BS 106A, in procedure 850/852/854. The procedure 850/852/854 may be similar to any one of the procedures 350, 452, or 554 of FIG. 3, 4, or 5, respectively.

In one implementation and scenario, prior to the UE 102 determining that a condition for handing over to a first candidate target cell of C-BS 106A is satisfied, the S-BS 104A determines 861 to reconfigure (e.g., replace, modify) or release the configuration(s) previously sent to the UE 102 for communication at event 802, or to add new configuration(s) to the UE 102. For example, the S-BS 104A may determine 861 to reconfigure or release the configuration(s) if the S-BS 104A becomes congested or has less data to transmit to the UE 102 after having previously sent the conditional handover configuration(s) to the UE 102.

The S-BS 104A can assign less radio resources to the UE 102 in reconfigured configuration(s) than in the previously sent configuration(s), or release the configuration(s), for example. In another example, the S-BS 104A may determine 861 to reconfigure the configuration(s) or add the new configuration(s) if the S-BS 104A becomes uncongested or has more data to transmit to the UE 102 after having previously sent the conditional handover configuration(s) to the UE 102. The S-BS 104A can assign more radio resources to the UE 102 in reconfigured or newly added configuration(s) than in the previously sent configuration(s), for example. In some implementations, the configuration(s) (i.e., previously sent configuration(s), reconfigured configuration(s), new configuration(s)) can include a radio bearer configuration (e.g., RadioBearerConfig IE, DRB-ToAddMod IE or DRB-ToRelease IE). In other implementations, the configuration(s) can include one or more configurations in a CellGroupConfig IE or in a RadioResourceConfigDedicated IE.

In some scenarios, the C-BS 106A may be unaware that the S-BS 104A reconfigured the previously sent configuration(s). In such a case, if the UE 102 were to determine that a condition for handing over to the C-BS 106A is satisfied, a communication error may result from the UE 102 attempting to use the reconfigured configuration(s) to communicate with the C-BS 106A. To prevent such communication errors, in response to the S-BS 104A determining 861 to reconfigure the configuration(s) or adding new configuration(s), the S-BS 104A may determine to release 862 the conditional handover configuration previously sent to the UE 102 during procedure 850/852/854. In response to the determination 862, the S-BS 104A transmits 865 an RRC reconfiguration message to the UE 102. The RRC reconfiguration message includes an indication to release the previously sent conditional handover configuration. In response to receiving the RRC reconfiguration message, the UE 102 releases 867 the previously sent conditional handover configuration. By releasing 867 the previously sent conditional handover configuration, the UE 102 is prevented from performing the conditional handover to the C-BS 106A using the previously sent conditional handover configuration. In response to the determination 862, the S-BS 104A may optionally also transmit 864 a Handover Cancel message (or Handover Cancel Request message) to the C-BS 106A, for the C-BS 106A to also release the conditional handover configuration.

In some scenarios, in response to the S-BS 104A determining 861 to reconfigure the configuration(s), the S-BS 104A determines 863 to release the condition(s) for the UE 102, in addition to or instead of determining 862 to release the previously sent conditional handover configuration. In response to the determination 863, the S-BS 104A transmits 866 an RRC reconfiguration message to the UE 102. The RRC reconfiguration message indicates (e.g., instructs the UE 102 to) release of the condition(s). In response to receiving the RRC reconfiguration message, the UE 102 releases 868 the condition(s). By releasing 868 the condition(s), the UE 102 is prevented from determining that the condition(s) are satisfied, thereby preventing the UE 102 from performing the conditional handover to the C-BS 106A.

In response to receiving the RRC reconfiguration message at events 865 and/or 866, the UE 102 transmits 869 an RRC reconfiguration complete message to the S-BS 104A.

In some implementations, the S-BS 104A transmits 865 the RRC reconfiguration message to the UE 102, before or after transmitting 864 the Handover Cancel message to the C-BS 106A. In other implementations, the S-BS 104A may transmit 865 the RRC reconfiguration message to the UE 102 and transmit 864 the Handover Cancel message to the C-BS 106A simultaneously.

In some implementations, the C-BS 106A may also release the conditional handover configuration. In one such implementation, C-BS 106A consists of a CU (e.g., CU 172) and at least one DU (e.g., DU 174), as shown in FIG. 1C. In procedure 850/852/854, the CU 172 receives one or more conditional handover configurations from the DU(s) 174. The CU 172 receives the Handover Cancel message from the S-BS 104A at event 864, and in response, sends a UE Context Release Command message to each of the DU(s) 174. Each of the DU(s) 174 releases a particular one of the conditional handover configuration(s) in response to the UE Context Release Command message. Each of the DU(s) 174 may send a UE Context Release Complete message to the CU 172 in response to the UE Context Release Command message.

In FIG. 9, in a conditional handover scenario 900 the base station 104A operates as an S-BS for the UE 102, and the base station 106A operates as a C-BS for the UE 102. Unlike the implementations and scenarios of FIG. 8 in which the S-BS 104A instructs the UE 102 to release a conditional handover configuration to prevent the UE 102 from attempting to handover to C-BS 106A, in the scenario 900, the S-BS 104A instructs the UE 102 to reconfigure the condition corresponding to the conditional handover configuration.

Initially, the UE 102 communicates 902 data (e.g., UL data PDUs and/or DL data PDUs) with the S-BS 104A. The S-BS 104A then at some point determines to configure a conditional handover, and configures the UE 102 with at least one conditional handover configuration, and one or more corresponding conditions, for conditional handover to the C-BS 106A, in procedure 950/952/954. The procedure 950/952/954 may be similar to any one of the procedures 350, 452, or 554 of FIG. 3, 4, or 5, respectively.

In one implementation and scenario, prior to the UE 102 determining that a condition for handing over to a first candidate target cell of C-BS 106A is satisfied, the S-BS 104A determines 971 to reconfigure (e.g., replace, modify) or release the condition(s) for the UE 102. In some implementations, the S-BS 104A determines 971 to reconfigure the condition(s) if the S-BS 104A reconfigures or releases configuration(s) previously sent to the UE 102 for communication at event 902, or to add new configuration(s) to the UE 102. In response to the S-BS 104A determining 971 to reconfigure the condition(s), the S-BS 104A transmits 972 an RRC reconfiguration message including the reconfigured condition(s) to the UE 102. In turn, the UE 102 reconfigures 973 the condition(s), and transmits 974 an RRC reconfiguration complete message to the S-BS 104A in response to the RRC reconfiguration message. In some implementations, the UE 102 may release the conditional handover configuration(s) corresponding to the condition(s) previously sent during the procedure 950/952/954 in response to receiving the RRC reconfiguration message at event 972 or in response to reconfiguring 973 the condition(s).

In some implementations, the S-BS 104A determines 971 to reconfigure the condition(s) such that the UE 102 has little or no chance of determining that the reconfigured condition(s) are satisfied, thereby preventing the UE 102 from attempting to connect to the C-BS 106A. In response to the determination 971, the S-BS 104A transmits 972 the reconfigured condition(s) in an RRC reconfiguration message. In response to receiving 972 the RRC reconfiguration message, the UE 102 reconfigures 973 the condition(s). In one implementation, the S-BS 104A transmits 972 the RRC reconfiguration message releasing the condition(s). In response to receiving 972 the RRC reconfiguration message, the UE 102 releases 973 the condition(s).

In other implementations, the S-BS 104A determines 971 to reconfigure the condition(s) based on network congestion. In one such implementation, to prevent the UE 102 from handing over to a congested C-BS 106A, the S-BS 104A can determine 971 to reconfigure the condition(s) in response to receiving a notification (e.g., from the C-BS 106A, a core network or an operation and maintenance (O&M) node) that the C-BS 106A is congested. If one of the condition(s) received in procedure 950/952/954 includes a low threshold for the UE 102 to compare with its measurement result(s) on a candidate target cell of the C-BS 106A, the reconfigured condition(s) may include a higher threshold so that the UE 102 is less likely to detect that the reconfigured condition(s) is satisfied and hand over to the C-BS 106A. In another such implementation, to expedite handover to C-BS 106A, e.g.,  due to limited available resources or congestion at the S-BS 104A, the S-BS 104A can determine 971 to reconfigure the condition(s) to include a threshold that is lower than the one included in the condition(s) received in procedure 950/952/954, so that the UE 102 is more likely to detect, or more likely to detect at an earlier time, that the reconfigured condition(s) are satisfied.

In FIG. 10, in a conditional handover scenario 1000, the base station 104A operates as an S-BS for the UE 102, and the base station 106A operates as a C-BS for the UE 102. Unlike the implementations and scenarios of FIGS. 8 and 9 in which the S-BS 104A instructs the UE 102 to release a conditional handover configuration or its corresponding condition to prevent the UE 102 from attempting to hand over to C-BS 106A, in the scenario 1000, the S-BS 104A provides a reconfigured conditional handover configuration to UE 102 to enable the UE 102 to handover to C-BS 106A.

Initially, the UE 102 communicates 1002 data (e.g., UL data PDUs and/or DL data PDUs) with the S-BS 104A. The S-BS 104A then at some point determines to configure a conditional handover, and configures the UE 102 with at least one conditional handover configuration, and one or more corresponding conditions, for conditional handover to the C-BS 106A, in procedure 1050/1052/1054. The procedure 1050/1052/1054 may be similar to any one of the procedures 350, 452, or 554 of FIG. 3, 4, or 5, respectively.

In one implementation and scenario, prior to the UE 102 determining that a condition for handing over to a first candidate target cell of C-BS 106A is satisfied, the S-BS 104A determines 1061 to reconfigure (e.g., replace or otherwise modify) the conditional handover configuration(s) previously sent to the UE 102 during procedure 1050/1052/1054. For example, the S-BS 104A determines 1061 to reconfigure the conditional handover configuration(s) in response to determining to reconfigure or release configuration(s) previously sent to the UE 102 for communication at event 802, or to add new configuration(s) to the UE 102, as described for event 861. In response, the S-BS 104A transmits 1063 a modification request message (e.g., Handover Request message, Handover Modification Request) to the C-BS 106A, which in turn generates a reconfigured conditional handover configuration in response to the modification request message.

In another implementation and scenario, rather than the S-BS 104A determining 1061 to reconfigure the conditional handover configuration, the C-BS 106A determines 1062 to reconfigure the conditional handover configuration. The C-BS 106A may determine 1062 to reconfigure the conditional handover configuration if the C-BS 106A becomes congested after having previously sent the at least one conditional handover configuration to the UE 102, for example. The C-BS 106A can assign less radio resources to the UE 102 in the reconfigured conditional handover configuration than in the previously sent conditional handover configuration. In response, the C-BS 106A generates a reconfigured conditional handover configuration. The C-BS 106A may determine 1062 to reconfigure the conditional handover configuration if the C-BS 106A becomes uncongested after having previously sent the at least one conditional handover configuration to the UE 102, in another example. The C-BS 106A can assign more radio resources to the UE 102 in the reconfigured conditional handover configuration than in the previously sent conditional handover configuration. In response, the C-BS 106A generates a reconfigured conditional handover configuration.

In any event, after the C-BS 106A generates the reconfigured conditional handover configuration, the C-BS 106A includes the reconfigured conditional handover configuration in a modification message (e.g., a Handover Request Acknowledge message, Handover Modification message, or Handover Cancel message) and transmits 1064 the modification message to the S-BS 104A. In response, the S-BS 104A transmits 1065 the reconfigured conditional handover configuration to the UE 102, which in turn reconfigures 1066 the previously sent conditional handover configuration according to the reconfigured conditional handover configuration. The UE 102 may optionally transmit an RRC reconfiguration complete message to the S-BS 104A in response to receiving the reconfigured conditional handover configuration.

In some implementations, the S-BS 104A transmits a Handover Cancel message (or Handover Cancel Request message) to the C-BS 106A before transmitting 1063 the modification request message to the C-BS 106A. The S-BS 104A uses the Handover Cancel Request message to request the C-BS 106A to release the conditional handover configuration that was previously configured for the UE 102. Then, the C-BS 106A generates the reconfigured conditional handover configuration in response to the modification request message, and includes the reconfigured conditional handover configuration in the modification message. In response to receiving the modification message, the S-BS 104A provides 1065 the reconfigured conditional handover configuration to the UE 102, which in turn reconfigures the previously sent conditional handover configuration with the reconfigured conditional handover configuration.

In some implementations, the S-BS 104A determines 1061 to reconfigure the conditional handover configuration in response to reconfiguring a radio bearer configuration (e.g., RadioBearConfig) after having already provided the radio bearer configuration to the UE 102 in the procedure 1050/1052/1054. In one such implementation, if the S-BS 104A releases a radio bearer of the UE 102 after having already provided the radio bearer configuration to the UE 102, the S-BS 104A transmits 1063 the Handover Request message to the C-BS 106A that either includes a reconfigured radio bearer configuration that excludes the released radio bearer, or includes an indication for the C-BS 106A to exclude the released radio bearer when generating the reconfigured radio bearer configuration. In turn, the C-BS 106A generates the reconfigured conditional handover configuration that excludes one or more configurations corresponding to the released radio bearer. In another such implementation, if the S-BS 104A adds a radio bearer of the UE 102 after having already provided the radio bearer configuration to the UE 102, the S-BS 104A transmits 1063 a Handover Request message to the C-BS 106A that either includes a reconfigured radio bearer configuration that includes the added radio bearer, or includes an indication for the C-BS 106A to include the added radio bearer when generating the reconfigured radio bearer configuration. In turn, the C-BS 106A generates the reconfigured conditional handover configuration that includes one or more configurations corresponding to the added radio bearer.

In some implementations, after the UE 102 and the S-BS 104A derive ciphering key(s) and integrity key(s) from a security key to communicate data, the S-BS 104A generates a new security key and sends 1063 the new security key in a Handover Request message to the C-BS 106A. In turn, the C-BS 106A generates a reconfigured conditional handover configuration, which includes a new security configuration and other configurations (e.g., a physical layer configuration, a MAC configuration, an RLC configuration, a PDCP configuration, an SDAP configuration, and/or a radio bearer configuration). The C-BS 106A then includes the reconfigured conditional handover configuration in the Handover Request Acknowledge message, and transmits 1064 the Handover Request Acknowledge message to the S-BS 104A.

Figure 11:
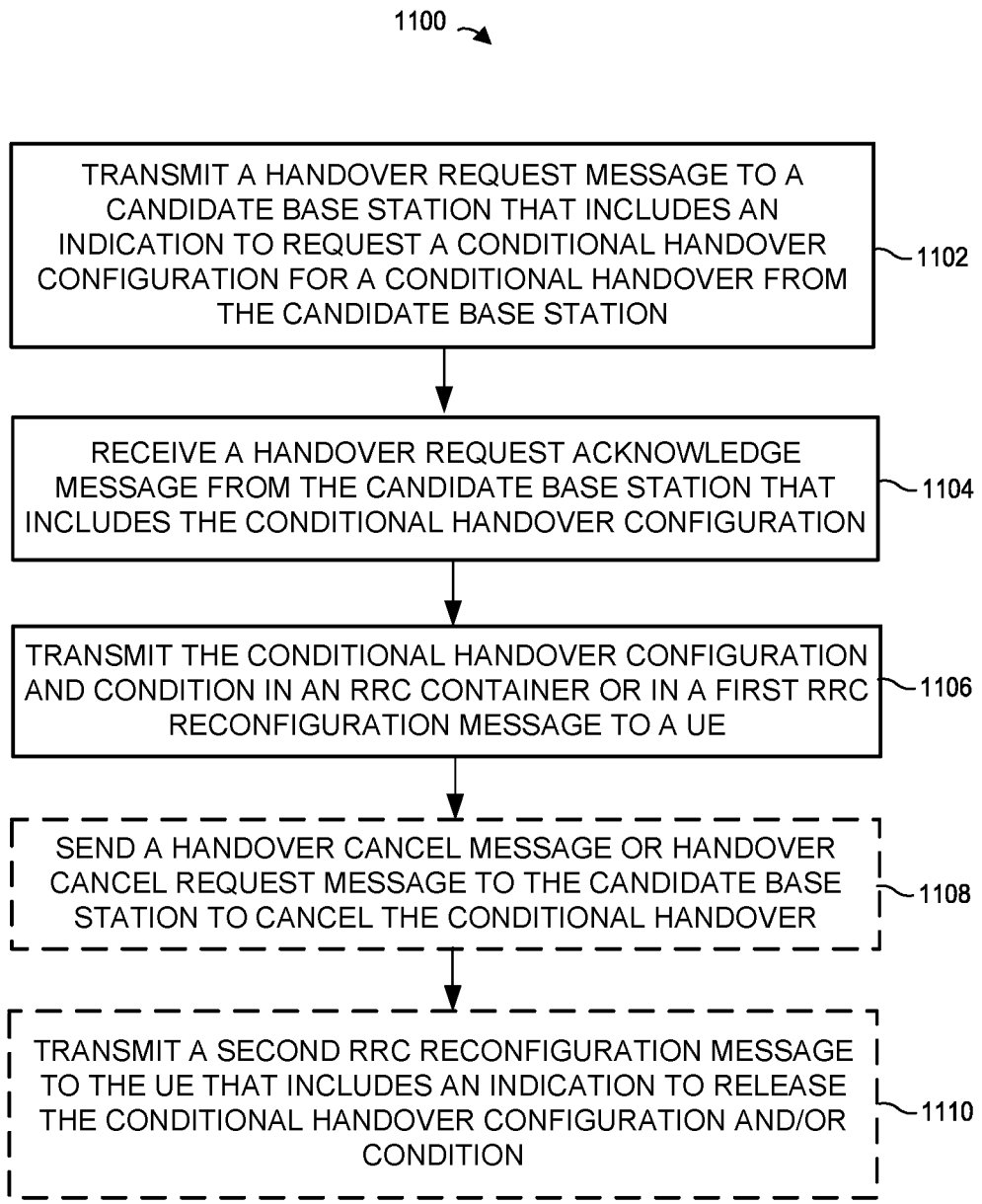
FIG. 11 is a flow diagram depicting an example method, implemented in a source base station, of facilitating a conditional handover.

FIG. 11 is a flow diagram depicting an example method 1100, implemented in a source base station (e.g., S-BS 104A) to facilitate a conditional handover.

In the method 1100, at block 1102, the source base station transmits (e.g., in any one of events 306, 406, or 506) a Handover Request message to a candidate base station (e.g., C-BS 106A) that includes an indication to request a conditional handover configuration for a conditional handover from the candidate base station. The conditional handover configuration is associated with a condition to be satisfied before the user device can communicate with the candidate base station, or via a candidate target cell (e.g., cell 126A) of the candidate base station, using the conditional handover configuration. In some implementations, the Handover Request message includes the condition.

At block 1104, the source base station receives (e.g., in any one of events 308, 408, 508) a Handover Request Acknowledge message from the candidate base station that includes the conditional handover configuration. In implementations in which the Handover Request message includes the condition, the Handover Request Acknowledge message can include the same condition or a reconfigured condition that is negotiated between the source base station and the candidate base station.

At block 1106, the source base station transmits (e.g., in any one of events 312, 412, 512) the conditional handover configuration and condition to a user device (e.g., UE 102). The conditional handover configuration and condition can be included in an RRC container or in an RRC reconfiguration message, for example.

At block 1108, the source base station may optionally determine to cancel the conditional handover, and thus send (e.g., in event 864) a Handover Cancel message or Handover Cancel Request message to the candidate base station.

If the method 1100 includes block 1108, then at block 1110 the source base station may transmit (e.g., in any one of events 865, 866) another RRC reconfiguration message to the user device, including an indication to release the conditional handover configuration and/or the condition.

Figure 12:
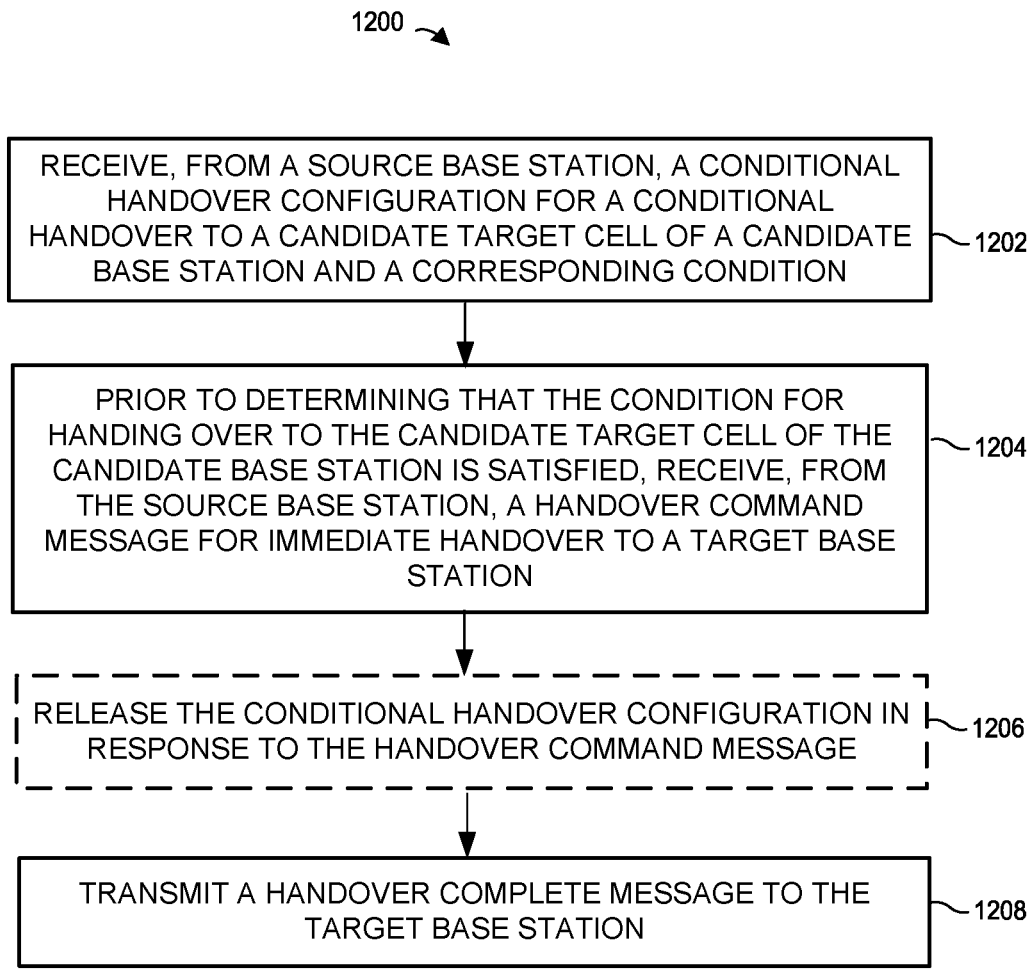
FIG. 12 is a flow diagram depicting an example method, implemented in a UE, of performing an immediate handover during a conditional handover procedure.

FIG. 12 is a flow diagram depicting an example method 1200, implemented in a user device (e.g., the UE 102), of performing an immediate handover during a conditional handover procedure.

In the method 1200, at block 1202, the user device receives (e.g., in any one of events 312, 412, 512, 612, 614, 616), from a source base station (e.g., the S-BS 104A), a conditional handover configuration for a conditional handover to a candidate target cell of a candidate base station (e.g., the C-BS 106A), and a corresponding condition. The conditional handover configuration and condition can be included in an RRC container message or in a RRC reconfiguration message, for example.

At block 1204, prior to the user device determining that the condition for handing over to the candidate target cell of the candidate base station is satisfied, the user device receives (e.g., in event 613) from the source base station a handover command message (e.g., an RRC reconfiguration message) for immediate handover to a target base station (e.g., the T-BS 104B). The handover command message configures a target cell of the target base station for the user device.

At block 1206, the user device optionally releases (e.g., in event 631) the conditional handover configuration in response to the handover command message. Otherwise, the user device may unnecessarily be storing and/or accounting for the conditional handover configuration and the corresponding condition received at block 1202 from the source base station.

At block 1208, regardless of whether the user device releases the conditional handover configuration at block 1206, the user device transmits (e.g., in event 622) a Handover Complete message (e.g., an RRC reconfiguration complete message) to the target base station in response to the handover command message, thereby performing an immediate handover to the target base station. As such, the target base station becomes the source base station for the user device, and the user device starts communicating data with the source base station.

Figure 13:
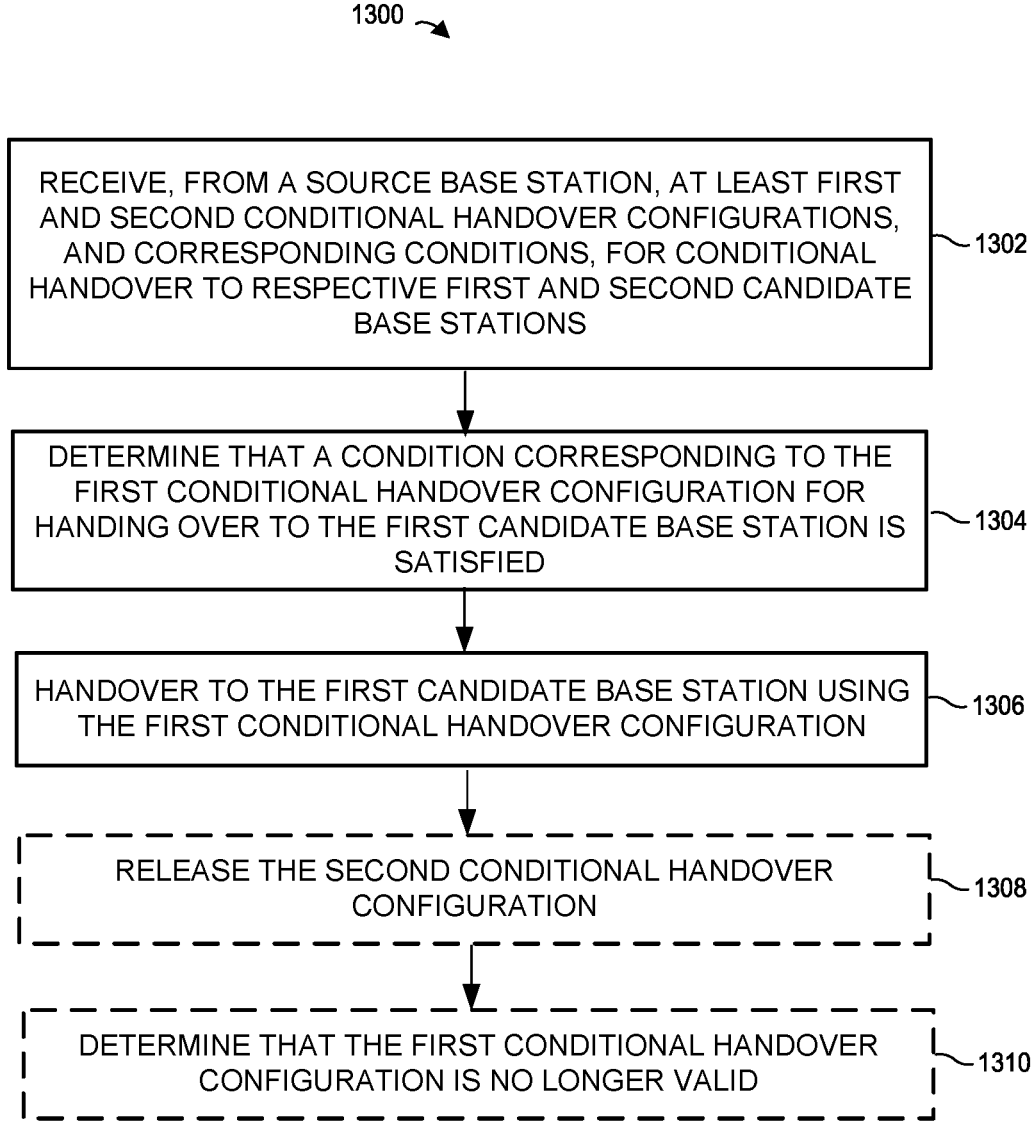
FIG. 13 is a flow diagram depicting an example method, implemented in a UE, of managing conditional handover configurations when handing over to a particular candidate base station.

FIG. 13 is a flow diagram depicting an example method 1300, implemented in a user device (e.g., the UE 102), of managing conditional handover configurations when handing over to a particular candidate base station (e.g., C-BS 106A).

In the method 1300, at block 1302, the user device receives (e.g., in events 750A/752A/754A, 750B/752B/754B) from a source base station (e.g., the S-BS 104A) at least two conditional handover configurations (e.g., a first conditional handover configuration and a second conditional handover configuration), and the corresponding conditions, for conditional handover to at least two respective candidate base stations, including a first candidate base station (e.g., the C-BS 106A) and a second candidate base station (e.g., the C-BS 104B).

At block 1304, the user device determines (e.g., in event 760) that a condition corresponding to the first conditional handover configuration is satisfied.

At block 1306, in response to the determination at block 1304, the user device hands over to the first candidate base station using the first conditional handover configuration. As such, the first candidate base station becomes the source base station for the user device, and the user device starts communicating data with the source base station.

At block 1308, in response to the determination at block 1304 or the handover at block 1306, the user device optionally releases (e.g., in event 731B) any other conditional handover configurations (e.g., the second conditional handover configuration) with which the user device was configured at the time of the determination or handover. Otherwise, the user device may unnecessarily be storing and/or accounting for the second conditional handover configuration and the corresponding condition received at block 1302 from the source base station.

At block 1310, the user device may optionally determine (e.g., in event 731A) that the first conditional handover configuration is no longer valid because the first conditional handover configuration has already been used at block 1306. In this way, if the user device later on detects a failure (e.g., radio link failure) on a communication link with the first candidate base station, and responds by selecting back to the first candidate target cell associated to the first conditional handover configuration, the user device will not hand over to the first candidate base station using the first conditional handover configuration.

Figure 14:
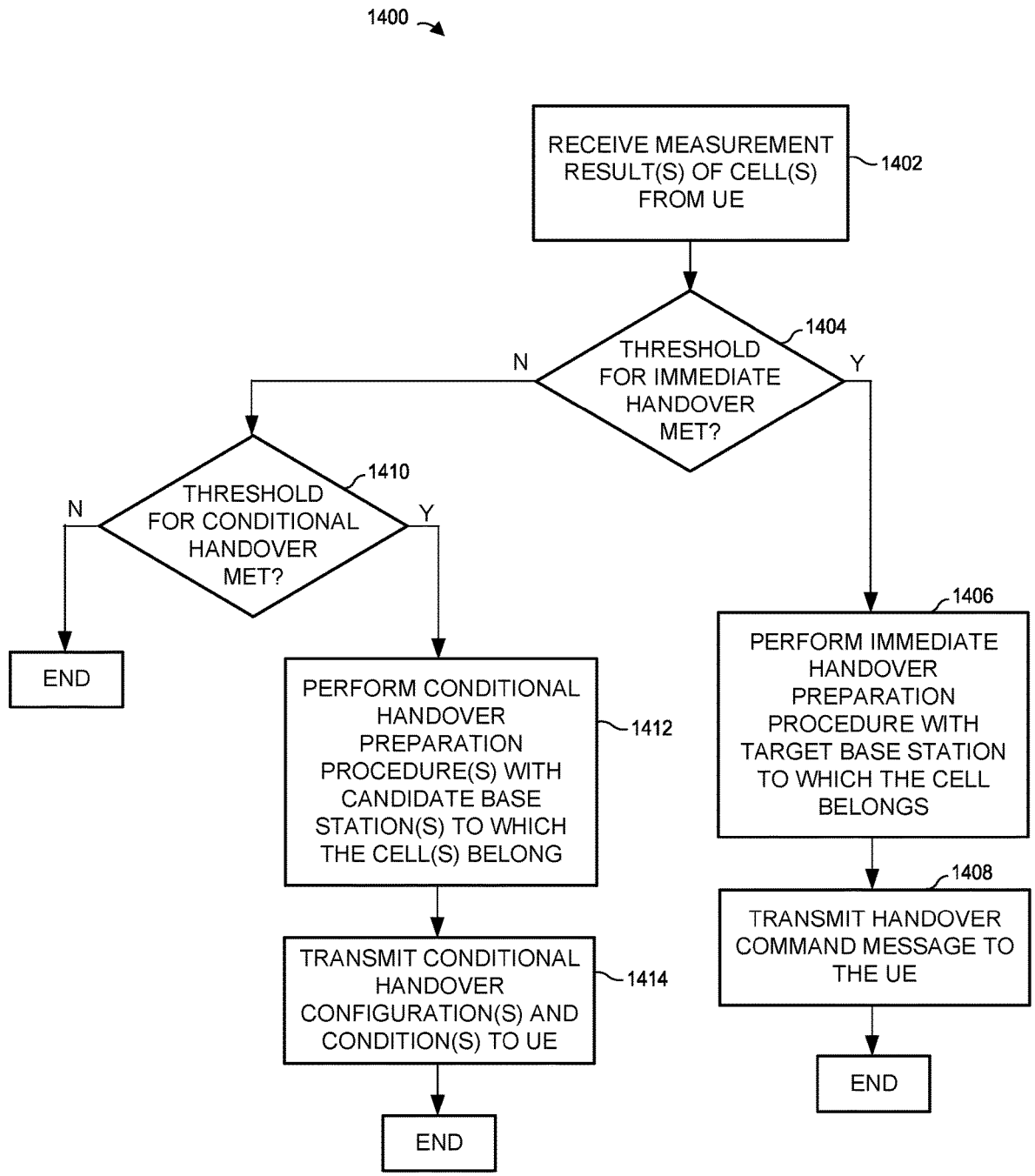
FIG. 14 is a flow diagram depicting an example method, implemented in a source base station, of performing an immediate handover preparation procedure or a conditional handover preparation procedure for a UE.

FIG. 14 is a flow diagram depicting an example method 1400, implemented in a source base station (e.g., the S-BS 104A), of selectively performing an immediate handover preparation procedure or a conditional handover preparation procedure for a user device (e.g., the UE 102).

In the method 1400, at block 1402, the source base station receives measurement result(s) of one or more cells from the user device. The measurement result(s) may include signal-to-noise ratio, signal-to-noise-plus-interference ratio, and/or any other suitable measurement indicative of channel quality and/or conditions.

At block 1404, the source base station determines (i.e., checks or detects) whether a threshold for immediate handover preparation is met according to the measurement result(s) received at block 1402 from the user device. As used herein, a "threshold" can be a single threshold/value or a set of thresholds/values.

If the measurement result(s) of a cell to which a target base station (e.g., base station 106A or 104B) belongs satisfy the threshold at block 1404, the source base station at block 1406 performs an immediate handover preparation procedure for the user device, to hand over to the target base station (e.g., as described above in connection with FIG. 6).

At block 1408, as a result of the immediate handover preparation procedure performed at block 1406, the source base station transmits (e.g., in event 613) a handover command message (e.g., an RRC reconfiguration message including a ReconfigurationWithSync IE) to the user device. The handover command message configures a primary cell (PCell) of the target base station for the user device. Upon receiving the handover command message, the user device hands over to the target base station via the PCell by performing a random access procedure with the target base station on the PCell.

If the measurement result(s) of the cell to which the target base station belongs instead do not satisfy the threshold at block 1404, the source base station at block 1410 determines whether a threshold for conditional handover preparation is met according to the measurement result(s) received from the user device at block 1402.

If the threshold for the conditional handover preparation is met, at block 1412 the source base station performs a conditional handover preparation procedure with a candidate base station to which the cell(s) belong to obtain one or more conditional handover configurations (e.g., as described above in connection with FIGS. 3-5 and 7-10).

At block 1414, the source base station transmits (e.g., in any one of events 312, 412, 512) conditional handover configuration(s) to the user device as a result of the conditional handover preparation procedure. In some implementations, the S-BS 104A may also transmit the condition(s) corresponding to the conditional handover configuration(s). The conditional handover configuration(s) and condition(s) can be included in an RRC container or in an RRC reconfiguration message, for example.

If the condition is not met at block 1412, the method 1400 may then proceed to a new iteration starting at block 1402, for example.

Figure 15:
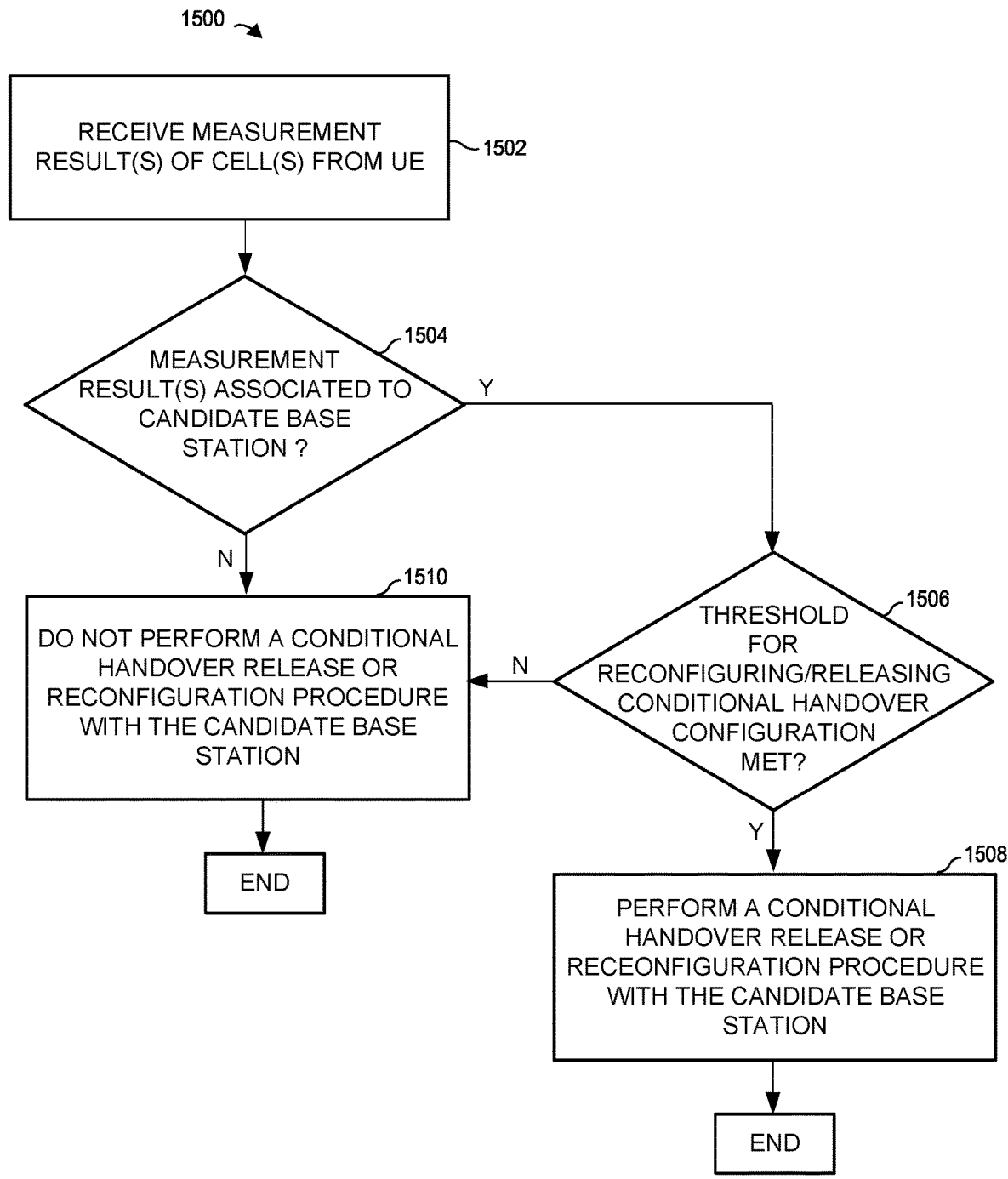
FIG. 15 is a flow diagram depicting an example method, implemented in a source base station, to reconfigure or release a conditional handover configuration stored at a UE.

FIG. 15 is a flow diagram depicting an example method 1500, implemented in a source base station (e.g., the S-BS 104A), for reconfiguring or releasing a conditional handover configuration stored at a user device (e.g., the UE 102).

In the method 1500, at block 1502, the source base station receives measurement result(s) of one or more cells from the user device. Block 1502 may be similar to block 1402, for example.

If the source base station determines at block 1504 that the measurement result(s) are associated to a candidate base station (e.g., the C-BS 106A) for which the source base station had configured the user device for conditional handover (e.g., in any one of events 350, 452, or 554), the S-BS 104A determines (i.e., checks or detects) at block 1506 whether a threshold for reconfiguring or releasing the conditional handover configuration stored at the user device is met, using the measurement result(s) received at block 1502 from the user device.

If the measurement result(s) satisfies the threshold, the source base station performs (e.g., in event 1061) at block 1508 a conditional handover release or reconfiguration procedure with the candidate base station (e.g., in any one of events 864, 1063).

If the measurement result(s) are not determined to be associated to the candidate base station at block 1504, or the measurement result(s) do not satisfy the threshold at block 1506, the source base station at block 1510 does not perform the conditional handover release or reconfiguration procedure. The method 1500 may then proceed to a new iteration starting at block 1502, for example.

Figure 16:
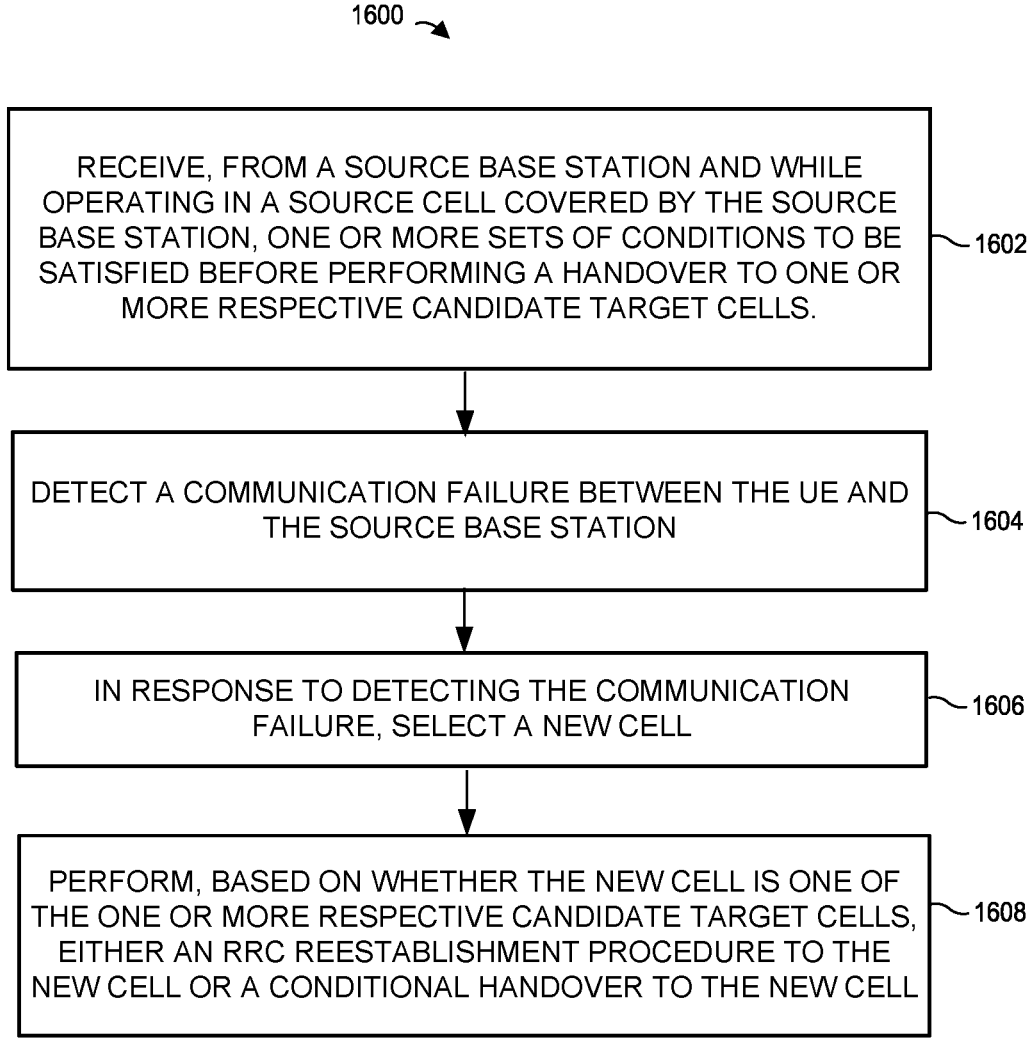
FIG. 16 is a flow diagram depicting an example method, implemented in a UE, for performing an immediate or conditional handover when a communication failure occurs.

FIG. 16 is a flow diagram depicting an example method 1600, implemented in a user device (e.g., the UE 102), for performing an immediate or conditional handover when a communication failure occurs.

In the method 1600, at block 1602, the user device receives, from a source base station (e.g., S-BS 104A) and while operating in a source cell covered by the source base station, one or more sets of conditions to be satisfied before the user device performs a handover to one or more respective candidate target cells.

At block 1604, the user device detects a communication failure (e.g., a radio link failure or other communication failure) between the user device and the source base station.

At block 1606, in response to detecting the communication failure, the user device selects a new cell.

At block 1608, the user device performs, based on whether the new cell is one of the one or more respective candidate target cells, either an RRC reestablishment procedure to the new cell or a conditional handover to the new cell. Particularly, if the user device determines that the new cell is a candidate target cell (i.e., a cell associated to a conditional handover configuration), the user device performs (e.g., in any one of events 360, 460, 560, 760) conditional handover to the new cell using the conditional handover configuration if a condition corresponding to the conditional handover configuration is met (and optionally later determines, e.g., in event 731A, that the conditional handover configuration is no longer valid). In some implementations, if the user device fails a random access procedure when performing the conditional handover, the user device can keep the invalid conditional handover configuration (and any remaining conditional handover configuration(s)), or alternatively release the invalid conditional handover configuration.

If the user device determines that the new cell is not a candidate target cell (i.e., not a cell associated with an immediate handover configuration), the user device performs (e.g., in event 620) the RRC reestablishment procedure with the new cell, and optionally releases (e.g., in any one of events 631, 731B) one or more conditional handover configurations corresponding to the one or more sets of conditions received from the source base station at block 1602. In some implementations, if the user device fails a random access procedure when performing the RRC reestablishment procedure, the user device can keep the conditional handover configuration(s). In this way, if the user device subsequently selects another cell that is associated to another conditional handover configuration(s), the user device can perform conditional handover to that cell according to the corresponding conditional handover configuration.

Alternatively, the user device releases the conditional handover configuration(s) when failing the random access procedure.

Figure 17:
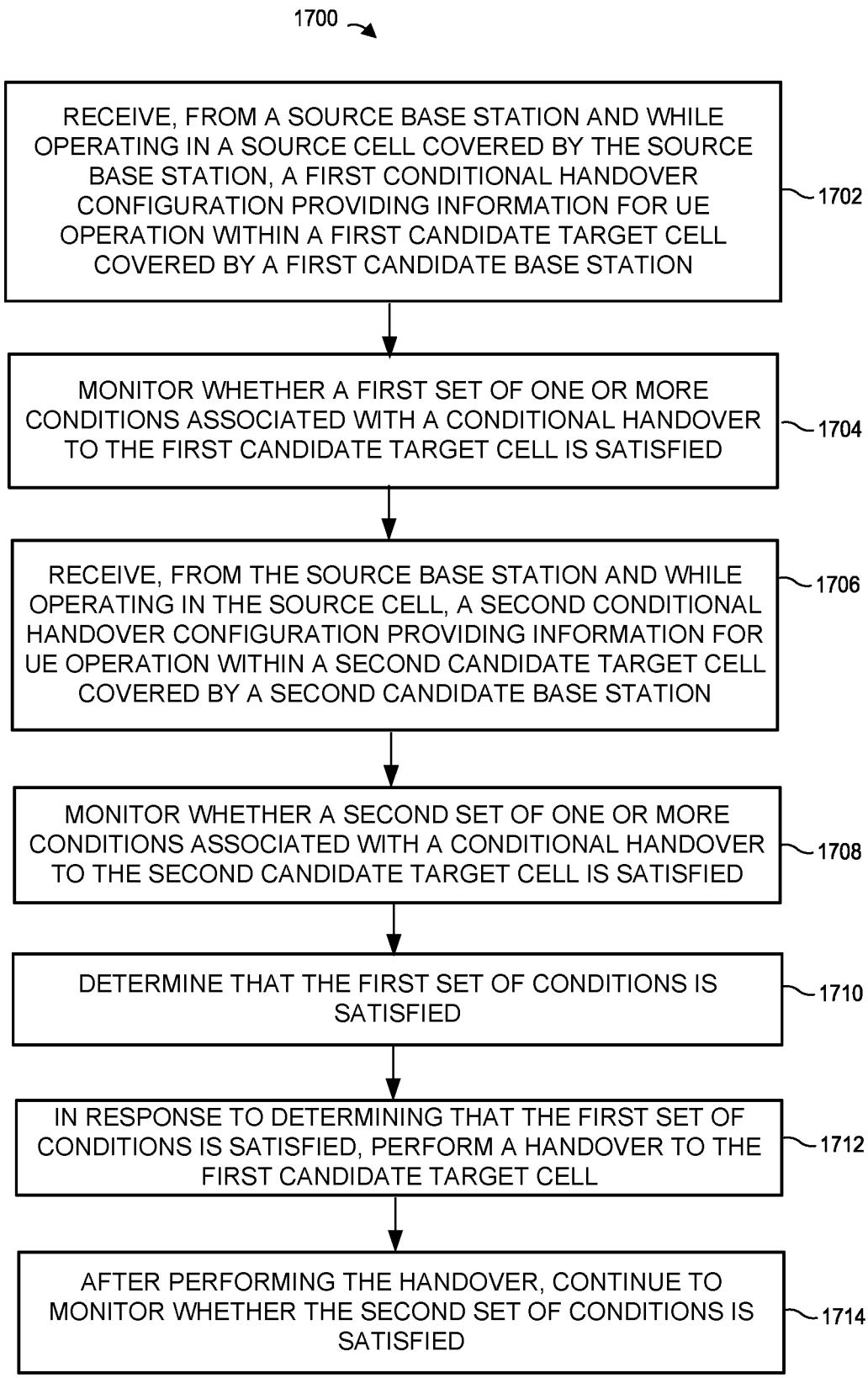
FIG. 17 is a flow diagram depicting an example method, implemented in a UE, for managing conditional handover configurations when performing conditional handover.

FIG. 17 is a flow diagram depicting an example method 1700, implemented in a user device (e.g., the UE 102), for managing conditional handover configurations when performing conditional handover.

In the method 1700, at block 1702, the user device receives (e.g., in event 750A/752A/754A), from a source base station (e.g., the S-BS 104A) and while the user device is operating in a source cell covered by the source base station, a first conditional handover configuration providing information for user device operation within a first candidate target cell covered by a first candidate base station (e.g., the C-BS 106A).

At block 1704, the user device monitors whether a first set of one or more conditions associated with a conditional handover to the first candidate target cell is satisfied.

At block 1706, the user device receives (e.g., in event 750B/752B/754B), from the source base station and while the user device is operating in the source cell, a second conditional handover configuration providing information for user device operation within a second candidate target cell covered by a second candidate base station (e.g., the C-BS 104B).

At block 1708, the user device monitors whether a second set of one or more conditions associated with a conditional handover to the second candidate target cell is satisfied.

At block 1710, the user device determines (e.g., in event 760) that the first set of conditions is satisfied, and in response, at block 1712, performs a handover to the first candidate target cell using the first conditional handover configuration.

In contrast to block 1308 of FIG. 13 in which the user device releases the second conditional handover configuration in response to handing over to the first candidate base station, the user device may keep the second conditional handover configuration. As such, at block 1714, after performing the handover, the user device can continue to monitor whether the second set of conditions is satisfied. If the second set of conditions is satisfied, the user device can handover to the second candidate base station using the kept second conditional handover configuration.

Figure 18:
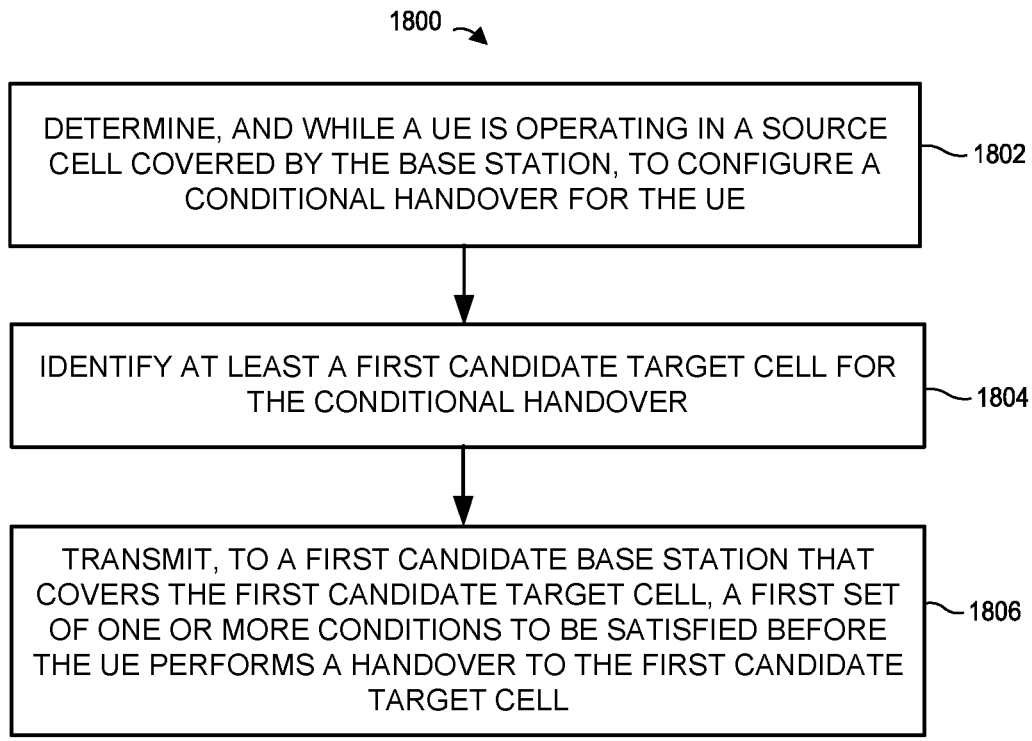
FIG. 18 is a flow diagram depicting an example method, implemented in a source base station, for providing conditions for a conditional handover to a base station associated with a candidate target cell.

FIG. 18 is a flow diagram depicting an example method 1800, implemented in a source base station (e.g., the S-BS 104A), for providing conditions for a conditional handover to a base station associated with a candidate target cell (e.g., the C-BS 106A).

In the method 1800, at block 1802, the source base station determines (e.g., in event 404), while a user device (e.g., the UE 102) is operating in a source cell covered by the source base station, to configure a conditional handover for the user device.

At block 1804, the source base station identifies at least a first candidate target cell for the conditional handover.

At block 1806, the source base station transmits (e.g., in event 406), to the first candidate base station that covers the first candidate target cell, a first set of one or more conditions to be satisfied before the user device performs a handover to the first candidate target cell.

Figure 19:
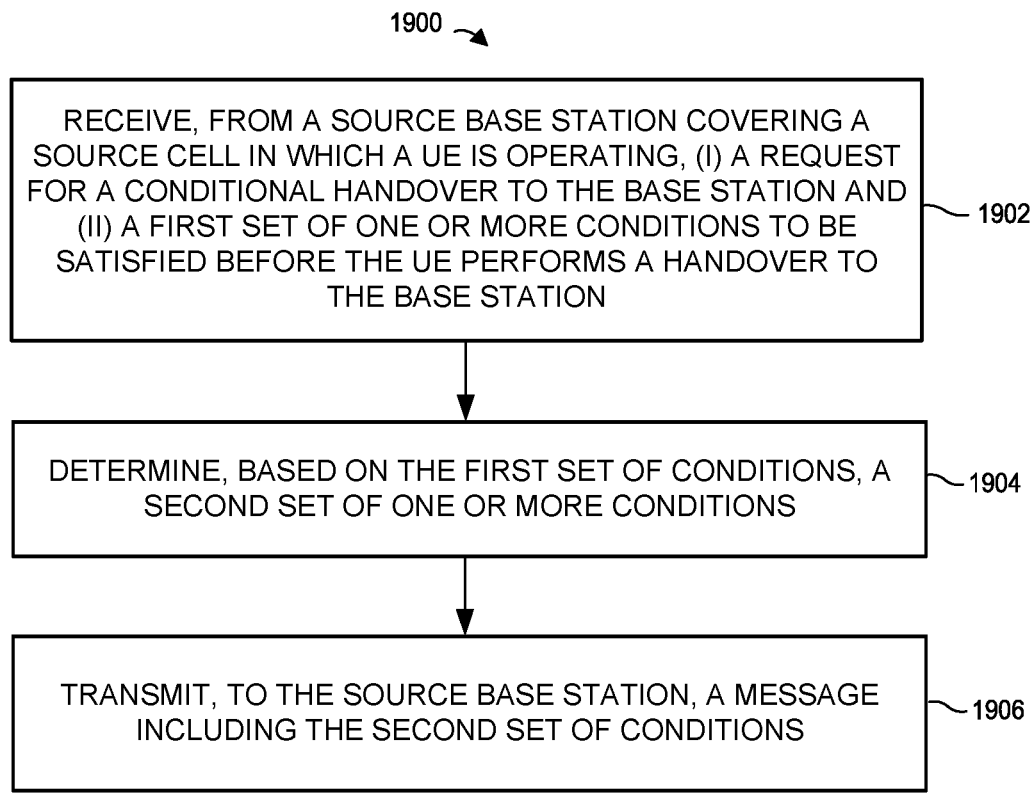
FIG. 19 is a flow diagram depicting an example method, implemented in a candidate base station, for modifying conditions for a conditional handover received from a source base station.

FIG. 19 is a flow diagram depicting an example method 1900, implemented in a candidate base station (e.g., the C-BS 106A), for facilitation the sharing and/or negotiation of conditions between a source base station (e.g., the S-BS 104A) and a candidate target base station (e.g., the C-BS 106A).

In the method 1900, at block 1902, the candidate base station receives (e.g., in event 406), from the source base station covering a source cell in which a user device (e.g., the UE 102) is operating, (1) a request for a conditional handover to the candidate base station and (2) a first set of one or more conditions to be satisfied before the user device performs a handover to the candidate base station.

At block 1904, the candidate base station determines, based on the first set of conditions, a second set of one or more conditions. For example, if the candidate base station determines that the condition(s) received from the source base station include a low threshold such that the user device would too easily determine that the condition(s) are satisfied, the candidate base station can determine a second set of condition(s) that includes a higher threshold.

At block 1906, the candidate base station transmits (e.g., in event 408), to the source base station, a message including the second set of conditions. The source base station can either accept or reject the second set of conditions.

Figure 20:
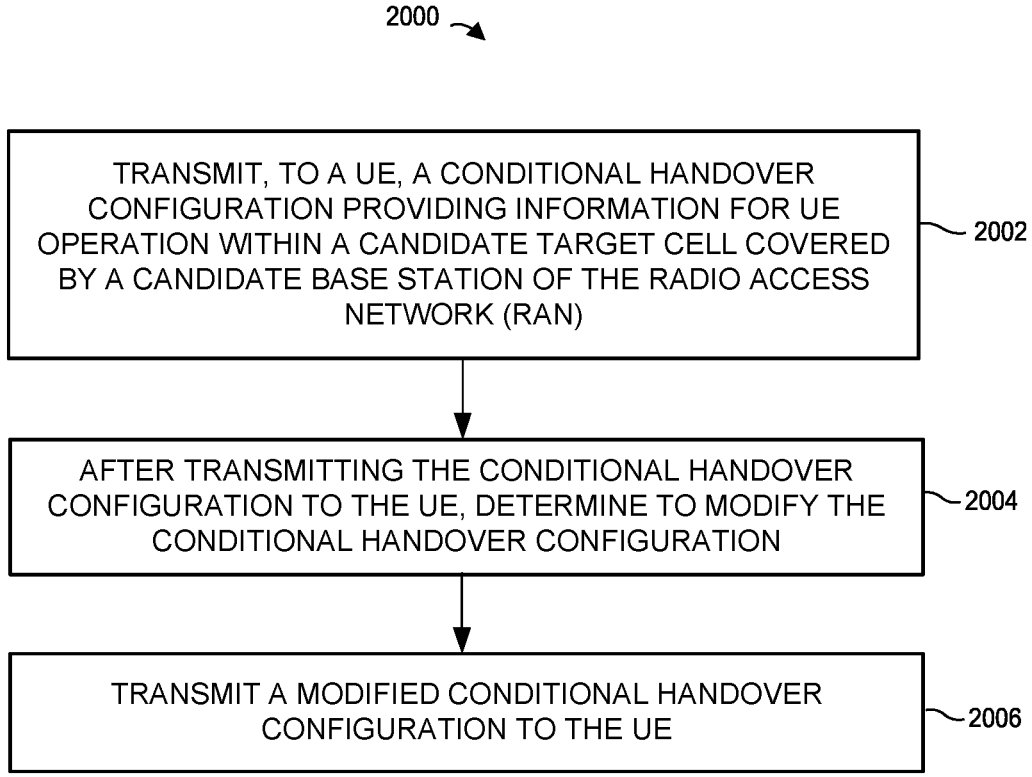
FIG. 20 is a flow diagram depicting an example method, implemented in a RAN, for modifying a conditional handover configuration that was previously sent to the UE.

FIG. 20 is a flow diagram depicting an example method 2000, implemented in a RAN (e.g., a RAN including the S-BS 104A and C-BS 106A), for modifying a conditional handover configuration that was previously sent to the UE.

In the method 2000, at block 2002, the RAN transmits (e.g., in procedure 1050/1052/1054), to a user device (e.g., the UE 102), a conditional handover configuration providing information for user device operation within a candidate target cell covered by a candidate base station of the RAN (e.g., cell 126A of C-BS 106A).

At block 2004, after transmitting the conditional handover configuration to the user device, the RAN determines (e.g., in any one of events 1061, 1062) to modify or replace the conditional handover configuration.

At block 2006, the RAN transmits (e.g., in event 1065) a modified conditional handover configuration to the user device.

The following additional considerations can apply to the foregoing discussion.

In some implementations, the source base station (e.g., S-BS 104A) may set different or the same condition(s) for respective candidate base station(s) (e.g., C-BS 106A, C-BS 104B), or for respective candidate target cells of the respective candidate base station(s). In one implementation, the source base station may set the condition(s) differently based on the coverages of different candidate base stations or candidate target cells. For example, the S-BS 104A may set a first threshold in a first condition for a first C-BS 106A or a first candidate target cell, and set a second threshold (e.g., greater than the first threshold) in a second condition for a second C-BS 104B or a second candidate target cell if coverage of the first C-BS 106A or the first candidate target cell is larger/smaller than coverage of the second C-BS 104B or the second candidate target cell.

In another implementation, the source base station may set the condition(s) differently based on different carrier frequencies on which the candidate base stations or the candidate target cells operate, or may set the same condition(s) if the candidate base stations or the candidate target cells operate on the same frequencies. For example, the S-BS 104A may set a first threshold in a first condition for a first C-BS 106A or a first candidate target cell, and set a second threshold (e.g., greater than the first threshold) in a second condition for a second C-BS 104B or a second candidate target cell if a downlink carrier frequency of the first C-BS or the first candidate target cell is lower/higher than a downlink carrier frequency of the second C-BS or the second candidate target cell.

In some implementations, a candidate base station (e.g., C-BS 106A) may start a first timer in response to the conditional handover preparation for the UE (e.g., UE 102). If the first timer expires, the C-BS 106A releases a conditional handover configuration for the UE 102. If the C-BS 106A connects to the UE 102 (e.g., in a random access procedure as described above), the C-BS 106A stops the first timer for the UE 102. A target base station (e.g., T-BS 104B) may start a second timer in response to the immediate handover preparation for a second UE (e.g., another UE similar to the UE 102) that has a shorter value than the first timer. If the second timer expires, the T-BS 104B releases an immediate handover configuration for the second UE. If the T-BS 106A connects to the second UE in a random access procedure, the T-BS 104B stops the second timer.

In some implementations, if a DU of the candidate base station (e.g., C-BS 106A) identifies the UE (e.g., UE 102) in the random access procedure, the DU may send a RAN node interface message to a CU of the candidate base station. In some implementations, the RAN node interface message is a F1 AP message defined in 3GPP Technical Specification 38.473. In one implementation, the F1 AP message indicates that the UE is connected. In other implementations, the F1 AP message includes the identity of the UE, to enable the CU to identify the UE or determine that the UE is connected. In another implementation, the interface message is a DL DATA DELIVERY STATUS frame as defined in NR user plane protocol. As soon as the DU detects the successful random access procedure (RACH) access by the UE for the corresponding data radio bearer(s), the DU sends the DL DATA DELIVERY STATUS frame to the CU.

In some implementations, the RRC reconfiguration messages discussed above can be RRCConnectionReconfiguration messages, and the RRC reconfiguration complete messages can be RRCConnectionReconfigurationComplete messages. In other implementations, the RRC reconfiguration messages can be RRCReconfiguration messages and the RRC reconfiguration complete messages can be RRCReconfigurationComplete messages.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of aspects reflects a variety of the embodiments explicitly contemplated by the present disclosure.

Aspect 1. A method, in a user device, comprising: receiving, by processing hardware of the user device and from a source base station while the user device is operating in a source cell of the source base station, a conditional handover configuration providing information for user device operation within a candidate target cell of a candidate base station, and a corresponding condition for handing over to the candidate target cell of the candidate base station; prior to determining that the condition is satisfied, receiving, by the processing hardware and from the source base station, a handover command message for immediate handover to a target base station; and after receiving the handover command message, releasing, by the processing hardware, the conditional handover configuration, and performing an immediate handover to the target base station.

Aspect 2. The method of aspect 1, wherein performing the immediate handover to the target base station includes performing a random access procedure with the target base station, and wherein releasing the conditional handover configuration comprises releasing the conditional handover configuration after performing the random access procedure.

Aspect 3. The method of aspect 1, wherein releasing the conditional handover configuration comprises releasing the conditional handover configuration in response to the handover command message.

Aspect 4. The method of aspect 3, wherein the handover command message includes an indication to release the conditional handover configuration, and wherein releasing the conditional handover configuration in response to receiving the handover command message comprises releasing the conditional handover configuration in response to the indication included in the handover command message.

Aspect 5. The method of any one of aspects 1 through 4, wherein receiving the conditional handover configuration and the corresponding condition includes receiving an RRC container message that includes (i) an RRC reconfiguration that includes the conditional handover configuration and (ii) the corresponding condition.

Aspect 6. A method, in a user device, comprising: receiving, from a source base station and while the user device is operating in a source cell of the source base station, a first conditional handover configuration providing information for user device operation within a first candidate target cell of a first candidate base station; monitoring, by processing hardware of the user device, whether a first condition associated with a conditional handover to the first candidate target cell is satisfied; receiving, from the source base station and while the user device is operating in the source cell, a second conditional handover configuration providing information for user device operation within a second candidate target cell covered by a second candidate base station; monitoring, by the processing hardware, whether a second condition associated with a conditional handover to the second candidate target cell is satisfied; determining, by the processing hardware and while monitoring whether the first and second conditions are satisfied, that the first condition is satisfied; and in response to determining that the first condition is satisfied, performing a handover to the first candidate target cell, and releasing, by the processing hardware, the second conditional handover configuration.

Aspect 7. The method of aspect 6, further comprising: after performing the handover to the first candidate target cell, determining, by the processing hardware, that the first conditional handover configuration is no longer valid.

Aspect 8. The method of aspect 6, wherein releasing the second conditional handover configuration further comprises releasing all conditional handover configurations, other than the first conditional handover configuration, with which the user device was configured.

Aspect 9. A user device comprising hardware and configured to perform the method of any one of aspects 1 through 8.

Aspect 10. A method, in a base station, comprising: sending, by processing hardware of the base station and to a user device while the user device is operating in a source cell of the base station, a conditional handover configuration providing information for user device operation within a candidate target cell of a candidate base station, and a corresponding condition for handing over to the candidate target cell of the candidate base station; and causing, by the processing hardware, the user device to release the conditional handover configuration and perform an immediate handover to a target base station prior to the user device determining that the condition is satisfied, at least by sending, to the user device, a handover command message for immediate handover to the target base station.

Aspect 11. The method of aspect 10, wherein causing the user device to perform the immediate handover to the target base station includes causing the user device to perform a random access procedure with the target base station, and wherein causing the user device to release the conditional handover configuration comprises causing the user device to release the conditional handover configuration after performing the random access procedure.

Aspect 12. The method of aspect 10, wherein causing the user device to release the conditional handover configuration comprises causing the user device to release the conditional handover configuration in response to the handover command message.

Aspect 13. The method of aspect 12, wherein the handover command message includes an indication to release the conditional handover configuration, and wherein causing the user device to release the conditional handover configuration in response to the handover command message comprises causing the user device to release the conditional handover configuration in response to the indication included in the handover command message.

Aspect 14. The method of any one of aspects 10 through 13, wherein sending the conditional handover configuration and the corresponding condition includes sending an RRC container message that includes (i) an RRC reconfiguration that includes the conditional handover configuration and (ii) the corresponding condition.

Aspect 15. A method, in a base station, comprising: sending, by processing hardware of the base station and to a user device while the user device is operating in a source cell of the base station, a first conditional handover configuration providing information for user device operation within a first candidate target cell of a first candidate base station when a first condition associated with a conditional handover to the first candidate target cell is satisfied; sending, by the processing hardware and to the user device while the user device is operating in the source cell, a second conditional handover configuration providing information for user device operation within a second candidate target cell covered by a second candidate base station when a second condition associated with a conditional handover to the second candidate target cell is satisfied; and causing, by the processing hardware, the user device to release the second conditional handover configuration and perform a handover to the first candidate target cell after the user device determines that the first condition is satisfied.

Aspect 16. The method of aspect 15, further comprising: causing, by the processing hardware, the user device to determine that the first conditional handover configuration is no longer valid.

Aspect 17. The method of aspect 15, wherein causing the user device to release the second conditional handover configuration further comprises causing the user device to release all conditional handover configurations, other than the first conditional handover configuration, with which the user device was configured.

Aspect 18. A base station comprising hardware and configured to perform the method of any one of aspects 10 through 17.

Aspect 19. A method, in a base station, comprising: determining, by processing hardware of the base station and while a user device is operating in a source cell covered by the base station, to configure a conditional handover for the user device; identifying, by the processing hardware, at least a first candidate target cell for the conditional handover; and transmitting, to a first candidate base station that covers the first candidate target cell, an indication of a first set of one or more conditions to be satisfied before the user device performs a handover to the first candidate target cell.

Aspect 20. The method of aspect 19, further comprising: after transmitting the indication of the first set of conditions to the first candidate base station, receiving, from the first candidate base station, an indication of a second set of one or more conditions to be satisfied before the user device performs a handover to the first candidate target cell; and transmitting, to the user device, the indication of the second set of conditions.

Aspect 21. The method of aspect 20, wherein the second set of conditions differs from the first set of conditions.

Aspect 22. The method of aspect 20, further comprising: determining to modify the second set of conditions; and transmitting, to the user device, a modified second set of conditions providing updated information for user device operation within the first candidate target cell.

Aspect 23. The method of aspect 22, wherein: determining to modify the second set of conditions includes determining to modify the second set of conditions in response to receiving a notification that the first candidate base station is congested.

Aspect 24. The method of aspect 22, wherein: determining to modify the second set of conditions includes determining to modify the second set of conditions in response to determining a lack of available resources or congestion.

Aspect 25. The method of aspect 19, further comprising: receiving, from the first candidate base station, a conditional handover configuration providing information for user device operation within the first candidate target cell; and transmitting the conditional handover configuration to the user device.

Aspect 26. The method of aspect 25, further comprising: determining, by the processing hardware, to modify the conditional handover configuration; and transmitting, to the user device, a modified conditional handover configuration providing updated information for user device operation within the first candidate target cell.

Aspect 27. The method of aspect 25, further comprising: receiving, from the first candidate base station, a modified conditional handover configuration providing updated information for user device operation within the first candidate target cell; and transmitting, to the user device, the modified conditional handover configuration.

Aspect 28. The method of aspect 25, wherein: transmitting the indication of the first set of conditions to the first candidate base station includes transmitting a handover request message including the indication of the first set of conditions; and receiving the conditional handover configuration includes receiving a handover request acknowledgment message including the conditional handover configuration and either (i) the indication of the first set of conditions or (ii) an indication of a modified set of conditions.

Aspect 29. The method of aspect 25, further comprising: determining to configure an immediate handover for the user device; and transmitting, to the user device, a message to initiate the immediate procedure, wherein the user device releases the conditional handover configuration in response to the message.

Aspect 30. The method of aspect 19, further comprising: identifying, by the processing hardware, a second candidate target cell for another conditional handover; and transmitting, to the first candidate base station or a second candidate base station that covers the second candidate target cell, an indication of a second set of one or more conditions to be satisfied before the user device performs a handover to the second candidate target cell.

Aspect 31. The method of aspect 30, wherein the second set of conditions differs from the first set of conditions.

Aspect 32. The method of aspect 19, wherein: the first set of conditions includes a condition based on one or more metrics indicative of quality of a communication link between the base station and the user device; and the indication of the first set of conditions includes one or more threshold values.

Aspect 33. The method of aspect 19, wherein: the first set of conditions includes a condition based on a number, between a minimum value and a maximum value, randomly generated by the user device; and the indication of the first set of conditions includes a number having a fixed value between the minimum value and the maximum value.

Aspect 34. The method of aspect 19, wherein the first set of conditions includes a condition based on (i) a priority level of a conditional handover configuration providing information for user device operation within the first candidate target cell, and (ii) priority levels of other conditional handover configurations of the user device.

Aspect 35. The method of aspect 19, further comprising: receiving, from the first candidate base station and in response to transmitting the first set of one or more conditions, a rejection of the conditional handover.

Aspect 36. A method, in a base station, comprising: receiving, from a source base station covering a source cell in which a user device is operating, (i) a request for a conditional handover to the base station and (ii) an indication of a first set of one or more conditions to be satisfied before the user device performs a handover to the base station; determining, by processing hardware of the base station and based on the first set of conditions, a second set of one or more conditions; and transmitting, to the source base station, a message including an indication of the second set of conditions.

Aspect 37. The method of aspect 36, further comprising: receiving, from the source base station and in response to the message including the indication of the second set of conditions, a message indicating that the conditional handover to the base station is canceled.

Aspect 38. The method of aspect 36, further comprising: receiving, from the source base station and in response to the message including the indication of the second set of conditions, a message indicating acceptance of the second set of conditions.

Aspect 39. The method of aspect 38, further comprising: in response to receiving the message indicating acceptance of the second set of conditions, transmitting an additional message to the source base station, the additional message including (i) the indication of the second set of conditions and (ii) a conditional handover configuration providing information for user device operation within a cell covered by the base station.

Aspect 40. The method of aspect 36, wherein: the second set of conditions includes a condition based on one or more metrics indicative of quality of a communication link between the base station and the user device; and the indication of the second set of conditions includes one or more threshold values.

Aspect 41. The method of aspect 36, wherein: the second set of conditions includes a condition based on a number, between a minimum value and a maximum value, randomly generated by the user device; and the indication of the second set of conditions includes a number having a fixed value between the minimum value and the maximum value.

Aspect 42. The method of aspect 36, wherein the second set of conditions includes a condition based on (i) a priority level of a conditional handover configuration providing information for user device operation within a cell covered by the base station, and (ii) priority levels of other conditional handover configurations of the user device.

Aspect 43. A base station comprising hardware and configured to perform the method of any one of aspects 19 through 42.

Aspect 44. A method, in a user device, comprising: receiving, from a source base station and while the user device is operating in a source cell covered by the source base station, a first conditional handover configuration providing information for user device operation within a first candidate target cell covered by a first candidate base station; monitoring, by processing hardware of the user device, whether a first set of one or more conditions associated with a conditional handover to the first candidate target cell is satisfied; receiving, from the source base station and while the user device is operating in the source cell, a second conditional handover configuration providing information for user device operation within a second candidate target cell covered by a second candidate base station; monitoring, by the processing hardware, whether a second set of one or more conditions associated with a conditional handover to the second candidate target cell is satisfied; determining, by the processing hardware, that the first set of conditions is satisfied; in response to determining that the first set of conditions is satisfied, performing a handover to the first candidate target cell; and after performing the handover, continuing to monitor, by the processing hardware, whether the second set of conditions is satisfied.

Aspect 45. The method of aspect 44, further comprising: releasing the second conditional handover configuration.

Aspect 46. The method of aspect 44, further comprising: determining that the first conditional handover configuration is no longer valid after performing the handover to the first candidate target cell.

Aspect 47. A method, in a user device, comprising: receiving, from a source base station and while the user device is operating in a source cell covered by the source base station, indications of one or more sets of conditions to be satisfied before the user device performs a handover to one or more respective candidate target cells; detecting, by processing hardware of the user device, a communication failure between the user device and the source base station; in response to detecting the communication failure, selecting, by the processing hardware, a new cell; and performing, based on whether the new cell is one of the one or more respective candidate target cells, either an immediate handover to the new cell or a conditional handover to the new cell.

Aspect 48. The method of aspect 47, wherein the communication failure is a radio link failure.

Aspect 49. A user device comprising hardware and configured to perform the method of any one of aspects 44 through 48.

Aspect 50. A method, in a radio access network (RAN), comprising: transmitting, to a user device, a conditional handover configuration providing information for user device operation within a candidate target cell covered by a candidate base station of the RAN; after transmitting the conditional handover configuration to the user device, determining, by processing hardware of the RAN, to modify the conditional handover configuration; and transmitting a modified conditional handover configuration to the user device.

Aspect 51. The method of aspect 50, wherein: transmitting the conditional handover configuration to the user device is by a source base station of the RAN; determining to modify the conditional handover configuration is by the source base station; and transmitting the modified conditional handover configuration to the user device is by the source base station.

Aspect 52. The method of aspect 50, wherein: transmitting the conditional handover configuration to the user device is by a source base station of the RAN; determining to modify the conditional handover configuration is by the candidate base station; and transmitting the modified conditional handover configuration to the user device is by the source base station.

Aspect 53. The method of aspects 51 or 52, further comprising: releasing the conditional handover configuration.

Aspect 54. A radio access network (RAN) comprising hardware and configured to perform the method of any one of aspects 32 through 35.

What is claimed is:
1. A method, in a user device, comprising:
receiving, from a source base station and while the user device is operating in a source cell covered by the source base station, (i) multiple conditional handover configurations, each of which is for a respective candidate target cell of multiple candidate target cells, and (ii) indications of one or more sets of conditions to be satisfied before the user device performs a handover to a candidate target cell included in the multiple candidate target cells;

detecting, by the user device, a communication failure between the user device and the source base station; and in response to the detecting of the communication failure:
   selecting a first new cell that is one of the multiple candidate target cells;
   performing, using the respective conditional handover configuration for the first new cell received from the source base station, a conditional handover to the first new cell;
   failing a random access procedure with the first new cell; and
   subsequent to the failure of the random access procedure with the first new cell:
      releasing the multiple conditional handover configurations;
      selecting a second new cell that is not one of the multiple candidate target cells; and
      performing a radio resource control reestablishment procedure with the second new cell.

2. The method of claim 1, wherein the communication failure is a radio link failure.

3. The method of claim 1, further comprising:
prior to determining that a conditional handover condition is satisfied, receiving, a handover command message for immediate handover to a target cell; and
in response to receiving the handover command message, releasing the multiple conditional handover configurations regardless of whether the handover command message includes an indication indicating to release the multiple conditional handover configurations, and performing an immediate handover to the target cell.

4. A user device comprising one or more processors and a computer-readable memory storing machine-readable instructions that are executable by the one or more processors to cause the user device to:
receive, from a source base station and while the user device is operating in a source cell covered by the source base station, (i) multiple conditional handover configurations, each of which is for a respective candidate target cell of multiple candidate target cells, and (ii) indications of one or more sets of conditions to be satisfied before the user device performs a handover to a candidate target cell included in the multiple candidate target cells;

detect a communication failure between the user device and the source base station; and in response to the detected communication failure:
   select a first new cell that is one of the multiple candidate target cells;
   perform, using the respective conditional handover configuration for the first new cell received from the source base station, a conditional handover to the first new cell;
   fail a random access procedure with the first new cell; and
   subsequent to the failure of the random access procedure with the first new cell:
      release the multiple conditional handover configurations;
      select a second new cell that is not one of the multiple candidate target cells; and
      perform a radio resource reestablishment procedure with the second new cell.

5. The user device of claim 4, wherein the machine-readable instructions are further executable by the one or more processors to cause the user device to:
prior to determining that a condition is satisfied, receive, a handover command message for immediate handover to a target cell; and
in response to receiving the handover command message, release the multiple conditional handover configurations regardless of whether the handover command message includes an indication indicating to release the multiple conditional handover configurations, and perform an immediate handover to the target cell.

\* \* \* \* \*